United States Patent
Xu et al.

(10) Patent No.: US 12,207,267 B2
(45) Date of Patent: Jan. 21, 2025

(54) CORESET AND SEARCH SPACE SET DORMANCY INDICATION VIA DOWNLINK CONTROL INFORMATION

(71) Applicant: QUALCOMM Incorporated, San Diego, CA (US)

(72) Inventors: Huilin Xu, Temecula, CA (US); Linhai He, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 534 days.

(21) Appl. No.: 17/398,881

(22) Filed: Aug. 10, 2021

(65) Prior Publication Data
US 2022/0053542 A1   Feb. 17, 2022

Related U.S. Application Data

(60) Provisional application No. 63/064,850, filed on Aug. 12, 2020.

(51) Int. Cl.
*H04W 72/00* (2023.01)
*H04W 24/08* (2009.01)
(Continued)

(52) U.S. Cl.
CPC ........... *H04W 72/23* (2023.01); *H04W 24/08* (2013.01); *H04W 72/1263* (2013.01)

(58) Field of Classification Search
None
See application file for complete search history.

(56) References Cited

U.S. PATENT DOCUMENTS

| 2020/0092814 A1 | 3/2020 | Zhou et al. |
| 2021/0243741 A1* | 8/2021 | Lin ...................... H04W 76/28 |

(Continued)

OTHER PUBLICATIONS

Ericsson: "Discussion on Potential Enhancements for Power Savings During Active Time", 3GPP TSG RAN WG1 #102, 3GPP Draft, Tdoc R1-2006668, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 18, 2020-Aug. 28, 2020, 5 Pages, Aug. 8, 2020 (Aug. 8, 2020), XP051918182, Retrieved from the Internet: URL: https://ftp.3gpp.org/tsg_ran/WG1_RL1/TSGR1_102-e/Docs/R1-2006668.zip R1-2006668 Discussion on potential enhancements for power savings during active time.docx [retrieved on Aug. 8, 2020] paragraph [02.7].

(Continued)

*Primary Examiner* — Abdelillah Elmejjarmi
(74) *Attorney, Agent, or Firm* — Holland & Hart LLP

(57) ABSTRACT

Methods, systems, and devices for wireless communications are described. In some systems, a base station may indicate a dormancy status, such as dormant or non-dormant, for each of one or more control channel resources configured for a user equipment (UE) via a dormancy indication in downlink control information (DCI). The dormancy indication may include a set of bits, each bit indicating a dormancy status for a control channel resource or a group of control channel resources. The UE, based on determining the value of each bit of the set of bits, may determine the dormancy status of each of the one or more control channel resources and may monitor the control channel resources accordingly. For example, the UE may monitor control channel resources having a dormancy status of non-dormant and may refrain from monitoring control channel resources having a dormancy status of dormant.

30 Claims, 18 Drawing Sheets

(51) Int. Cl.
*H04W 72/1263* (2023.01)
*H04W 72/23* (2023.01)

(56) References Cited

U.S. PATENT DOCUMENTS

2021/0329677 A1* 10/2021 Huang ................ H04L 1/1896
2022/0232666 A1* 7/2022 Zhou ................ H04W 52/0206

OTHER PUBLICATIONS

International Search Report and Written Opinion—PCT/US2021/045601—ISA/EPO—Nov. 19, 2021 (206872WO).
NEC: "Reduced PDCCH Monitoring for Redcap NR Devices", 3GPP TSG RAN WG1 #102-e, 3GPP Draft, R1-2005778, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, 4 Pages, Aug. 7, 2020 (Aug. 7, 2020), XP051915035, Retrieved from the Internet: URL: https://ftp.3gpp.org/tsg_ran/WG1_RL1/TSGR1_102-e/Docs/R1-2005778.zip R1-2005778 Reduced PDCCH monitoring for Redcap NR devices.docx [retrieved on Aug. 7, 2020] paragraph [02 .1].
Qualcomm Incorporated: "Potential Techniques for UE Power Saving", 3GPP TSG-RAN WG1 #96, 3GPP Draft, R1-1903016, 3rd Generation Partnership Project (3GPP), Mobile Competence Centre, 650, Route Des Lucioles, F-06921, Sophia-Antipolis Cedex, France, vol. RAN-WG1, Mar. 1, 2019 (Mar. 1, 2019), pp. 1-33, XP051600713, Retrieved from the Internet: URL: http://www.3gpp.org/ftp/tsg%5Fran/WG1%5FRL1/TSGR1%5F96/Docs/R1%2D1983816%2Ezipparagraphs [3. 1. 1. 2. 2], [3. 4 .1].

* cited by examiner

CORESET AND SEARCH SPACE SET DORMANCY INDICATION VIA DOWNLINK CONTROL INFORMATION

CROSS REFERENCE

The present Application for Patent claims the benefit of U.S. Provisional Patent Application No. 63/064,850 by XU et al., entitled "CORESET AND SEARCH SPACE SET DORMANCY INDICATION VIA DOWNLINK CONTROL INFORMATION," filed Aug. 12, 2020, assigned to the assignee hereof, and expressly incorporated by reference herein.

TECHNICAL FIELD

The following relates to wireless communications, including control resource set (CORESET) and search space set dormancy indication via downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may monitor one or more control channels for downlink control signaling from a base station. Such monitoring may be associated with costly power consumption at the UE, which may adversely impact the battery life of the UE.

SUMMARY

The described techniques relate to improved methods, systems, devices, and apparatuses that support control resource set (CORESET) and search space set dormancy indication via downlink control information (DCI). Generally, the described techniques provide for determining a dynamically configured dormancy status for each of one or more control channel resources configured for a user equipment (UE). For example, a UE may receive, from a base station, a DCI message that indicates a dormancy status for each of one or more control channel resources configured for the UE. In some examples, the control channel resources may be resources that the UE may monitor for control signals, such as CORESETs or search space sets.

In some implementations, the indication of the dormancy status of the one or more control channel resources carried by the DCI message may be referred to as a dormancy indication and the dormancy indication may include a set of bits. To enable the UE to determine a correspondence between each bit of the set of bits and the dormancy status of each of the one or more control channel resources, the base station may provide a configuration to the UE for mapping each bit of the set of bits to a control channel resource. In some examples, each bit of the set of bits may correspond to one control channel resource. In some other examples, each bit of the set of bits may correspond to a group of control channel resources. The described techniques may additionally provide for determining the dormancy status of a control channel resources based on the value of a corresponding bit in the dormancy indication, configuring the dormancy indication (e.g., configuring how the bits of the dormancy indication are organized), and determining whether the dormancy indication provides a dormancy status of control channel resources or of secondary cells (which may be referred to as SCells), or both, among other methods and procedures for facilitating the use of DCI to configure a dormancy status of one or more control channel resources.

A method of wireless communication at a UE is described. The method may include receiving, from a base station, a DCI message including an indication of a dormancy status of one or more control channel resources configured for the UE, determining the dormancy status of the one or more control channel resources based on the indication in the DCI message, and monitoring the one or more control channel resources for control signals according to the determined dormancy status of the one or more control channel resources.

An apparatus for wireless communication at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive, from a base station, a DCI message including an indication of a dormancy status of one or more control channel resources configured for the UE, determine the dormancy status of the one or more control channel resources based on the indication in the DCI message, and monitor the one or more control channel resources for control signals according to the determined dormancy status of the one or more control channel resources.

Another apparatus for wireless communication at a UE is described. The apparatus may include means for receiving, from a base station, a DCI message including an indication of a dormancy status of one or more control channel resources configured for the UE, determining the dormancy status of the one or more control channel resources based on the indication in the DCI message, and monitoring the one or more control channel resources for control signals according to the determined dormancy status of the one or more control channel resources.

A non-transitory computer-readable medium storing code for wireless communication at a UE is described. The code may include instructions executable by at least one processor to receive, from a base station, a DCI message including an indication of a dormancy status of one or more control channel resources configured for the UE, determine the dormancy status of the one or more control channel resources based on the indication in the DCI message, and monitor the one or more control channel resources for control signals according to the determined dormancy status of the one or more control channel resources.

In some examples of the method, apparatuses, and non-transitory computer-readable medium described herein, the indication of the dormancy status of the one or more control channel resources may include operations, features, means, or instructions for receiving, from the base station, an indication of a configuration for mapping the one or more control channel resources to the first set of bits, and determining a correspondence between an index associated with each bit of the first set of bits and each control channel resource of the one or more control channel resources based on the configuration, where each bit of the first set of bits may be associated with a different index.

In some examples of the method, apparatuses, and non-transitory computer-readable medium described herein, determining the dormancy status of the one or more control channel resources based on the indication may include operations, features, means, or instructions for determining a value of a first bit of the first set of bits, where a first index associated with the first bit corresponds to a first control channel resource of the one or more control channel resources, and determining the dormancy status of the first control channel resource based on the value of the first bit.

In some examples of the method, apparatuses, and non-transitory computer-readable medium described herein, determining the dormancy status of the first control channel resource based on the value of the first bit may include operations, features, means, or instructions for determining that the first control channel resource may be non-dormant and monitoring a search space set associated with the CORESET according to a second dormancy status of the search space set, or determining that the first control channel resource may be dormant and refraining from monitoring a search space set associated with the CORESET.

In some examples of the method, apparatuses, and non-transitory computer-readable medium described herein, determining the dormancy status of the first control channel resource based on the value of the first bit may include operations, features, means, or instructions for determining to maintain or to change the dormancy status of the first control channel resource based on the value of the first bit.

Some examples of the method, apparatuses, and non-transitory computer-readable medium described herein may further include operations, features, means, or instructions for determining an identifier associated with each control channel resource of the one or more control channel resources, where the correspondence between the index associated with each bit of the first set of bits and each control channel resource of the one or more control channel resources may be based on an order of the identifier associated with each control channel resource, and ordering the one or more control channel resources from a lowest identifier to a highest identifier, where a first index associated with a first bit of the first set of bits corresponds to a first control channel resource associated with the lowest identifier and a last index associated with a last bit of the first set of bits corresponds to a second control channel resource associated with the highest identifier, or ordering the one or more control channel resources from the highest identifier to the lowest identifier, where the first index associated with the first bit of the first set of bits corresponds to a first control channel resource associated with the highest identifier and the last index associated with the last bit of the first set of bits corresponds to a second control channel resource associated with the lowest identifier.

Some examples of the method, apparatuses, and non-transitory computer-readable medium described herein may further include operations, features, means, or instructions for receiving, from the base station, a network signaling message including an indication of the one or more control channel resources, and determining the order of the one or more control channel resources based on the indication of the one or more control channel resources in the network signaling message.

In some examples of the method, apparatuses, and non-transitory computer-readable medium described herein, each bit of the first set of bits corresponds to a single control channel resource of the one or more control channel resources, or a group of control channel resources of the one or more control channel resources.

In some examples of the method, apparatuses, and non-transitory computer-readable medium described herein, the one or more control channel resources include one or more CORESETs and one or more search space sets, and where a first subset of the first set of bits may be associated with the one or more CORESETs and a second subset of the first set of bits may be associated with the one or more search space sets.

In some examples of the method, apparatuses, and non-transitory computer-readable medium described herein, the first subset of the first set of bits associated with the one or more CORESETs precede the second subset of the first set of bits associated with the one or more search space sets.

In some examples of the method, apparatuses, and non-transitory computer-readable medium described herein, the second subset of the first set of bits associated with the one or more search space sets precede the first subset of the first set of bits associated with the one or more CORESETs.

In some examples of the method, apparatuses, and non-transitory computer-readable medium described herein, the DCI message includes a second indication of a dormancy status of one or more cells, the indication including a first set of bits mapped to the one or more control channel resources and the second indication including a second set of bits mapped to the one or more cells.

In some examples of the method, apparatuses, and non-transitory computer-readable medium described herein, the first set of bits mapped to the one or more control channel resources precede the second set of bits mapped to the one or more cells.

In some examples of the method, apparatuses, and non-transitory computer-readable medium described herein, the second set of bits mapped to the one or more cells precede the first set of bits mapped to the one or more control channel resources.

Some examples of the method, apparatuses, and non-transitory computer-readable medium described herein may further include operations, features, means, or instructions for determining that the indication of the dormancy status received in the DCI message may be for the one or more control channel resources based on a value of a bit in the DCI message, where the bit may be one of a quantity of bits appended to the DCI message to convey the indication of the dormancy status, or the bit may be one of at least two bits in the DCI message that may be not used for the indication of the dormancy status.

In some examples of the method, apparatuses, and non-transitory computer-readable medium described herein, monitoring the one or more control channel resources further may include operations, features, means, or instructions for monitoring at least one of the one or more control channel resources for the control signals from the base station according to the determined dormancy status of the one or more control channel resources, where the base station may be a scheduling base station for the UE.

In some examples of the method, apparatuses, and non-transitory computer-readable medium described herein, monitoring the one or more control channel resources further may include operations, features, means, or instructions for monitoring the one or more control channel resources for the control signals from the base station according to the determined dormancy status of the one or more control channel resources, and where the indication of the dormancy status of the one or more control channel resources indicates that at least a subset of the one or more control channel resources are switched from dormant to non-dormant, and the method, apparatuses, and non-transitory computer-readable medium described herein may further include operations, features, means, or instructions for determining a data channel resource for receiving unicast data based on monitoring at least the subset of the one or more control channel resources, and receiving, from the base station, the unicast data over the data channel resource.

In some examples of the method, apparatuses, and non-transitory computer-readable medium described herein, the base station may include operations, features, means, or instructions for monitoring, based on a carrier indicator field (CIF) included in the DCI message, the one or more control channel resources for the control signals from a second base station different than the first base station according to the determined dormancy status of the one or more control channel resources.

Some examples of the method, apparatuses, and non-transitory computer-readable medium described herein may further include operations, features, means, or instructions for determining to monitor the one or more control channel resources for the control signals from the second base station based on a CIF included in the DCI message.

In some examples of the method, apparatuses, and non-transitory computer-readable medium described herein, monitoring the one or more control channel resources may include operations, features, means, or instructions for monitoring the one or more control channel resources for the control signals from a set of base stations that include the base station.

In some examples of the method, apparatuses, and non-transitory computer-readable medium described herein, the DCI message conveys the indication of the dormancy status of the one or more control channel resources exclusive of a dormancy status of one or more cells.

A method of wireless communication at a base station is described. The method may include determining a dormancy status of one or more control channel resources configured for a UE, transmitting, to the UE, a DCI message including an indication of the dormancy status of the one or more control channel resources, and transmitting, to the UE, control signals over the one or more control channel resources according to the determined dormancy status of the one or more control channel resources.

An apparatus for wireless communication at a base station is described. The apparatus may include at least one processor, memory coupled (e.g., operatively, communicatively, functionally, electronically, or electrically) to the at least one at least one processor, and instructions stored in the memory. The instructions may be executable by the at least one processor to cause the apparatus to determine a dormancy status of one or more control channel resources configured for a UE, transmit, to the UE, a DCI message including an indication of the dormancy status of the one or more control channel resources, and transmit, to the UE, control signals over the one or more control channel resources according to the determined dormancy status of the one or more control channel resources.

Another apparatus for wireless communication at a base station is described. The apparatus may include means for determining a dormancy status of one or more control channel resources configured for a UE, transmitting, to the UE, a DCI message including an indication of the dormancy status of the one or more control channel resources, and transmitting, to the UE, control signals over the one or more control channel resources according to the determined dormancy status of the one or more control channel resources.

A non-transitory computer-readable medium storing code for wireless communication at a base station is described. The code may include instructions executable by at least one processor to determine a dormancy status of one or more control channel resources configured for a UE, transmit, to the UE, a DCI message including an indication of the dormancy status of the one or more control channel resources, and transmit, to the UE, control signals over the one or more control channel resources according to the determined dormancy status of the one or more control channel resources.

In some examples of the method, apparatuses, and non-transitory computer-readable medium described herein, the indication of the dormancy status of the one or more control channel resources may include operations, features, means, or instructions for determining a correspondence between an index associated with each bit of the first set of bits and each control channel resource of the one or more control channel resources, where each bit of the first set of bits may be associated with a different index, and transmitting, to the UE, an indication of a configuration for mapping the one or more control channel resources to the first set of bits based on the correspondence.

In some examples of the method, apparatuses, and non-transitory computer-readable medium described herein, determining the dormancy status of the one or more control channel resources may include operations, features, means, or instructions for determining the dormancy status of a first control channel resource of the one or more control channel resources, and determining a value of a first bit of the first set of bits based on the dormancy status of the first control channel resource, where a first index associated with the first bit corresponds to the first control channel resource.

In some examples of the method, apparatuses, and non-transitory computer-readable medium described herein, determining the dormancy status of the first control channel resource may include operations, features, means, or instructions for determining that the first control channel resource may be non-dormant.

In some examples of the method, apparatuses, and non-transitory computer-readable medium described herein, the first control channel resource may include operations, features, means, or instructions for transmitting at least one control signal of the control signals over a search space set associated with the CORESET according to a second dormancy status of the search space set.

In some examples of the method, apparatuses, and non-transitory computer-readable medium described herein, determining the dormancy status of the first control channel resource may include operations, features, means, or instructions for determining that the first control channel resource may be dormant.

In some examples of the method, apparatuses, and non-transitory computer-readable medium described herein, the first control channel resource may include operations, features, means, or instructions for refraining from transmitting the control signals over a search space set associated with the CORESET.

In some examples of the method, apparatuses, and non-transitory computer-readable medium described herein, determining the dormancy status of the first control channel resource may include operations, features, means, or instructions for determining to maintain the dormancy status of the first control channel resource.

In some examples of the method, apparatuses, and non-transitory computer-readable medium described herein, determining the dormancy status of the first control channel resource may include operations, features, means, or instructions for determining to change the dormancy status of the first control channel resource.

Some examples of the method, apparatuses, and non-transitory computer-readable medium described herein may further include operations, features, means, or instructions for determining an identifier associated with each control channel resource of the one or more control channel resources, where the correspondence between the index associated with each bit of the first set of bits and each control channel resource of the one or more control channel resources may be based on an order of the identifier associated with each control channel resource.

Some examples of the method, apparatuses, and non-transitory computer-readable medium described herein may further include operations, features, means, or instructions for ordering the one or more control channel resources from a lowest identifier to a highest identifier, where a first index associated with a first bit of the first set of bits corresponds to a first control channel resource associated with the lowest identifier and a last index associated with a last bit of the first set of bits corresponds to a second control channel resource associated with the highest identifier.

Some examples of the method, apparatuses, and non-transitory computer-readable medium described herein may further include operations, features, means, or instructions for ordering the one or more control channel resources from a highest identifier to a lowest identifier, where a first index associated with a first bit of the first set of bits corresponds to a first control channel resource associated with the highest identifier and a last index associated with a last bit of the first set of bits corresponds to a second control channel resource associated with the lowest identifier.

Some examples of the method, apparatuses, and non-transitory computer-readable medium described herein may further include operations, features, means, or instructions for determining the order of the one or more control channel resources, and transmitting, to the UE, a network signaling message including an indication of the one or more control channel resources, where the indication of the one or more control channel resources in the network signaling message may be based on the order.

In some examples of the method, apparatuses, and non-transitory computer-readable medium described herein, each bit of the first set of bits corresponds to a single control channel resource of the one or more control channel resources.

In some examples of the method, apparatuses, and non-transitory computer-readable medium described herein, each bit of the first set of bits corresponds to a group of control channel resources of the one or more control channel resources.

In some examples of the method, apparatuses, and non-transitory computer-readable medium described herein, the one or more control channel resources include one or more CORESETs and one or more search space sets, and where a first subset of the first set of bits may be associated with the one or more CORESETs and a second subset of the first set of bits may be associated with the one or more search space sets.

In some examples of the method, apparatuses, and non-transitory computer-readable medium described herein, the first subset of the first set of bits associated with the one or more CORESETs precede the second subset of the first set of bits associated with the one or more search space sets.

In some examples of the method, apparatuses, and non-transitory computer-readable medium described herein, the second subset of the first set of bits associated with the one or more search space sets precede the first subset of the first set of bits associated with the one or more CORESETs.

In some examples of the method, apparatuses, and non-transitory computer-readable medium described herein, the DCI message includes a second indication of a dormancy status of one or more cells, the indication including a first set of bits mapped to the one or more control channel resources and the second indication including a second set of bits mapped to the one or more cells.

In some examples of the method, apparatuses, and non-transitory computer-readable medium described herein, the first set of bits mapped to the one or more control channel resources precede the second set of bits mapped to the one or more cells.

In some examples of the method, apparatuses, and non-transitory computer-readable medium described herein, the second set of bits mapped to the one or more cells precede the first set of bits mapped to the one or more control channel resources.

Some examples of the method, apparatuses, and non-transitory computer-readable medium described herein may further include operations, features, means, or instructions for determining that the indication of the dormancy status may be for the one or more control channel resources, and determining a value of a bit in the DCI message based on determining that the indication of the dormancy status may be for the one or more control channel resources.

In some examples of the method, apparatuses, and non-transitory computer-readable medium described herein, the bit may be one of a quantity of bits appended to the DCI message to convey the indication of the dormancy status.

In some examples of the method, apparatuses, and non-transitory computer-readable medium described herein, the bit may be one of at least two bits in the DCI message that may be not used for the indication of the dormancy status.

In some examples of the method, apparatuses, and non-transitory computer-readable medium described herein, transmitting the control signals over the one or more control channel resources according to the determined dormancy status of the one or more control channel resources may include operations, features, means, or instructions for transmitting the control signals over at least one of the one or more control channel resources, where the base station may be a scheduling base station for the UE.

Some examples of the method, apparatuses, and non-transitory computer-readable medium described herein may further include operations, features, means, or instructions for transmitting, to the UE, an indication of a data channel resource over a control channel resource of at least the subset of control channel resources, and transmitting, to the UE, unicast data over the data channel resource.

In some examples of the method, apparatuses, and non-transitory computer-readable medium described herein, the one or more control channel resources include control channel resources associated with a set of base stations that include the base station.

In some examples of the method, apparatuses, and non-transitory computer-readable medium described herein, the DCI message conveys the indication of the dormancy status of the one or more control channel resources exclusive of a dormancy status of one or more cells.

DETAILED DESCRIPTION

Figure 1:
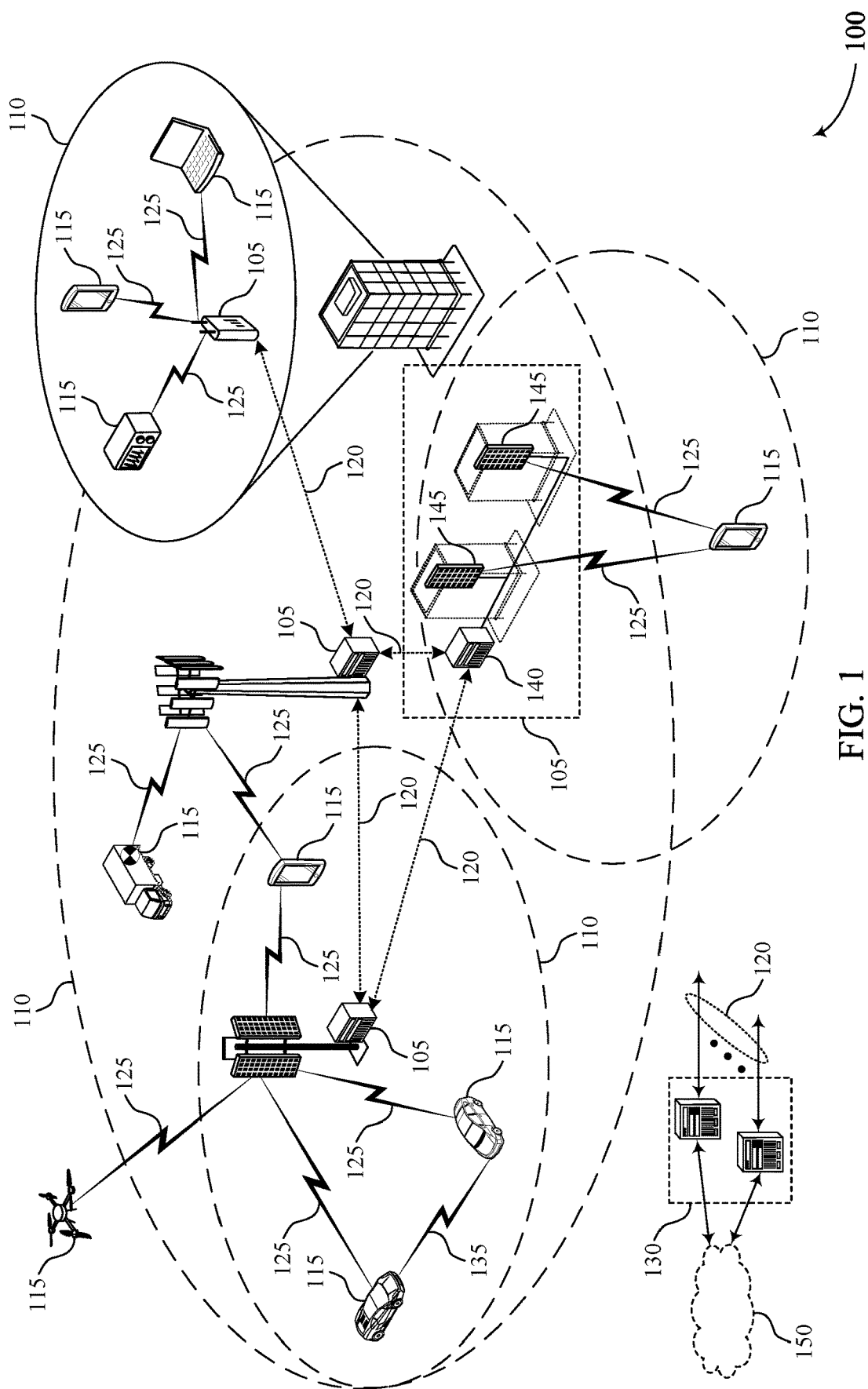
FIGS. 1 and 2 illustrate examples of wireless communications systems that support control resource set (CORESET) and search space set dormancy indication via downlink control information (DCI) in accordance with aspects of the present disclosure.

In some wireless communications systems, a base station may transmit control signaling to a user equipment (UE) over a control channel, such as a physical downlink control channel (PDCCH), and the UE may attempt to receive the control signaling by monitoring one or more control channel resources. In some aspects, such control channel resources may be referred to as or include a PDCCH monitoring occasion. A PDCCH monitoring occasion may include one or more search space sets within a configured control resource set (CORESET). In some cases, for example, the UE may be configured with one or more CORESETs, each CORESET associated with (e.g., including) one or more search space sets, and the UE may monitor the search space sets of the configured CORESETs for control signaling. Such monitoring of control channel resources for control signaling, however, may consume a costly amount of battery power of the UE, which may adversely impact the battery life of the UE. As such, the UE may improve power savings if, upon entrance of the UE into a power saving mode or during periods of PDCCH inactivity, the UE refrains from monitoring some or all of the control channel resources configured for the UE.

In some implementations of the present disclosure, the base station may transmit a dormancy indication within downlink control information (DCI) to the UE and the UE may use the dormancy indication to determine a dormancy status of one or more of the control channel resources (e.g., which may include one or both of CORESETs and search space sets) configured for the UE. For example, the base station may include, within a DCI message, a dormancy indication including a set of bits that are indicative of a dormancy status for each of the one or more control channel resources configured for the UE. Such a dormancy status of a control channel resource may indicate whether or not the UE monitors the control channel resource for control signaling. For instance, in examples in which the UE determines that a control channel resource is dormant (e.g., is associated with a dormancy status of "dormant"), the UE may refrain from monitoring the control channel resource for control signaling from the base station. For example, if a control channel resource is dormant, the UE may refrain from buffering signals received on the control channel resource for decoding or may not attempt blind decoding over the control channel resource. Alternatively, if the UE determines that the control channel resource is non-dormant (e.g., associated with a dormancy status of "non-dormant"), the UE may monitor the control channel resource for control channel signaling from the base station. For example, if a control channel resource is non-dormant, the UE may buffer signals received on the control channel resource for decoding or may attempt blind decoding over the control channel resource. In some aspects, the UE may determine whether a control channel resource has a dormancy status of dormant or non-dormant based on determining a value of a bit within the dormancy indication corresponding to the control channel resource.

Particular aspects of the subject matter described herein may be implemented to realize one or more potential advantages. The described techniques may be implemented by a UE to potentially reduce the amount of control channel monitoring that the UE performs to receive downlink control signaling from a base station. For example, based on receiving a dynamic configuration or indication of a dormancy status for each of the one or more control channel resources configured for the UE via DCI, the UE may monitor the one or more control channel resources according to the determined dormancy status of each of the one or more control channel resources (which may include monitoring or not monitoring, depending on the determined dormancy status). Based on reducing the amount of control channel monitoring performed by the UE, the UE may reduce the amount of battery power used by one or more monitoring components of the UE, which may improve power savings and increase the battery life of the UE.

Aspects of the disclosure are initially described in the context of wireless communications systems. Aspects of the disclosure are additionally described in the context of dormancy indication DCI and a process flow. Aspects of the disclosure are further illustrated by and described with reference to apparatus diagrams, system diagrams, and flowcharts that relate to CORESET and search space set dormancy indication via downlink control information.

FIG. 1 illustrates an example of a wireless communications system 100 that supports CORESET and search space set dormancy indication via DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a geographic coverage area 110 over which the UEs 115 and the base station 105 may establish one or more communication links 125. The geographic coverage area 110 may be an example of a geographic area over which a base station 105 and a UE 115 may support the communication of signals according to one or more radio access technologies. Components within a wireless communication system may be coupled (for example, operatively, communicatively, functionally, electronically, and/or electrically) to each other.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as category (CAT)-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT), or FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may establish a wireless connection with a base station 105 that uses multiple component carriers or cells. For example, the base station 105 may serve the UE 115 using a primary cell (PCell) and one or more secondary cells (SCells). In some cases, the base station 105 and the UE 115 may support SCell dormancy behavior (e.g., in carrier aggregation applications). Such SCell dormancy behavior may define dormant and non-dormant operation modes for an activated SCell and the base station 105 may switch an activated SCell between dormant and non-dormant operation modes. If an activated cell is dormant, the UE 115 may reduce its activity on the SCell (e.g., for power saving). For example, for an SCell that is in a dormant operation mode, the UE 115 may refrain from monitoring a PDCCH, refrain from receiving over a physical downlink shared channel (PDSCH), reduce a frequency of channel measurement and reporting (e.g., such as reduced channel state information (CSI) measuring and reporting), or refrain or otherwise reduce other operations associated with communication over the SCell. Alternatively, for an SCell that is in a non-dormant operation mode, the UE 115 may have full resource utilization on the SCell (e.g., the UE 115 may perform regular operation on an SCell when the SCell is in a non-dormant operation mode).

In cases in which multiple SCells are configured to the UE 115, the base station 105 may indicate the dormancy status of each of the multiple SCells via DCI. In other words, the base station 105 (e.g., the network) may configure each SCell of the multiple SCells to be dormant or non-dormant in DCI. The base station 105 may include the indication of the dormancy status of each of the multiple SCells, which may be referred to herein as a dormancy indication, in different DCI formats. In some cases, for example, the base station 105 may include a dormancy indication of SCells in a DCI format 0_1 or in a DCI format 1_1. In cases in which the dormancy indication of the multiple SCells is included in a DCI format 0_1, the base station 105 may indicate a dormancy status for up to a quantity of (e.g., five) SCells (or SCell groups) via the DCI and may also schedule uplink or downlink data for the UE 115 via the DCI. In cases in which the dormancy indication of the multiple SCells is included in a DCI format 1_1, the quantity of SCells (or SCell groups) that the base station 105 may provide a dormancy status for may be based on whether the DCI format 1_1 also schedules uplink or downlink data.

For example, in cases in which the DCI format 1_1 schedules uplink or downlink data and includes the dormancy indication for the multiple SCells, the base station 105 may indicate a dormancy status for up to a first quantity of (e.g., five) SCells (or SCell groups) via the DCI. In such cases in which a DCI includes a dormancy indication of SCells and schedules uplink or downlink data, the base station 105 may provide the dormancy indication via an additional bitmap that is appended to the DCI. For example, the additional bitmap may include up to the first quantity of bits (e.g., five bits) and each bit may indicate a dormancy status for one SCell or one SCell group (which may include multiple SCells).

Alternatively, in cases in which the DCI format 1_1 does not schedule uplink or downlink data, the base station 105 may indicate a dormancy status for up to a second quantity of (e.g., fifteen) configured SCells (or SCell groups). In some cases, such a DCI format 1_1 that is exclusively used for indicating a dormancy status for SCells (e.g., does not also schedule uplink or downlink data) may be smaller than a DCI format 0_1 or a DCI format 1_1 that schedules uplink or downlink data. For example, in a DCI format 1_1 that includes a dormancy indication for multiple SCells and does not schedule uplink or downlink data, some DCI fields that may sometimes be used to carry uplink or downlink scheduling information may be repurposed to carry the SCell dormancy indication and, as such, the base station 105 may refrain from using an additional bitmap appended to the DCI to convey the dormancy indication. The base station 105 may size-align a DCI format 1_1 that is exclusively used for indicating a dormancy status for SCells with DCI formats that schedule uplink or downlink data by appending a number of reserved bits to the DCI format 1_1 that does not schedule uplink or downlink data.

In some cases, the base station 105 may indicate that a DCI format 1_1 includes an indication of a dormancy status for SCells and does not schedule uplink or downlink data via an invalid value of a frequency domain resource assignment (FDRA) field in the DCI (e.g., which may otherwise be used to schedule a frequency resource for uplink or downlink data). For example, the base station 105 may set the FDRA field to an invalid value by setting the bits of the FDRA field to all 0's or all 1's. Additional details relating to how a DCI format 1_1 may be configured to convey a dormancy indication are described herein, including with reference to FIG. 3.

In some implementations of the present disclosure, such a method for conveying an indication of a dormancy status (per SCell or per group of SCells) via DCI may be extended to other use cases within the wireless communications system 100, such as to monitoring occasions configured at the UE 115. In some cases, for example, PDCCH monitoring at the UE 115 may consume a large portion of the battery power of the UE 115. As such, the UE 115 may improve power savings if, upon entrance of the UE into a power saving mode or during periods of PDCCH inactivity, the UE 115 refrains from monitoring some or all of a set of PDCCH monitoring occasions. Such PDCCH monitoring occasions may include control channel resources, such as CORESETs or search space sets.

For example, in some implementations, a base station 105 may transmit a dormancy indication to a UE 115 in DCI that indicates a dormancy status of one or more control channel resources that are configured for the UE 115. Accordingly, the UE 115 may determine a dormancy status, such as dormant or non-dormant, of each of the one or more control channel resources based on the dormancy indication. Upon determining the dormancy status of each of the one or more control channel resources, the UE 115 may monitor for control signals over the one or more control channel resources according to the determined dormancy status of each of the one or more control channel resources. For example, the UE 115 may determine that a first control channel resource has a dormancy status of non-dormant based on a value of a first bit in the dormancy indication and, accordingly, may monitor the first control channel resource for control signals. Additionally or alternatively, the UE 115 may determine that a second control channel resource is associated with a dormancy status of dormant based on a value of a second bit in the dormancy indication and may accordingly refrain from monitoring the second control channel resource for control signals. Additional details relating to such a dormancy indication for control channel resources (e.g., PDCCH monitoring occasions) are described herein, including with reference to FIGS. 2 through 4.

Figure 2:
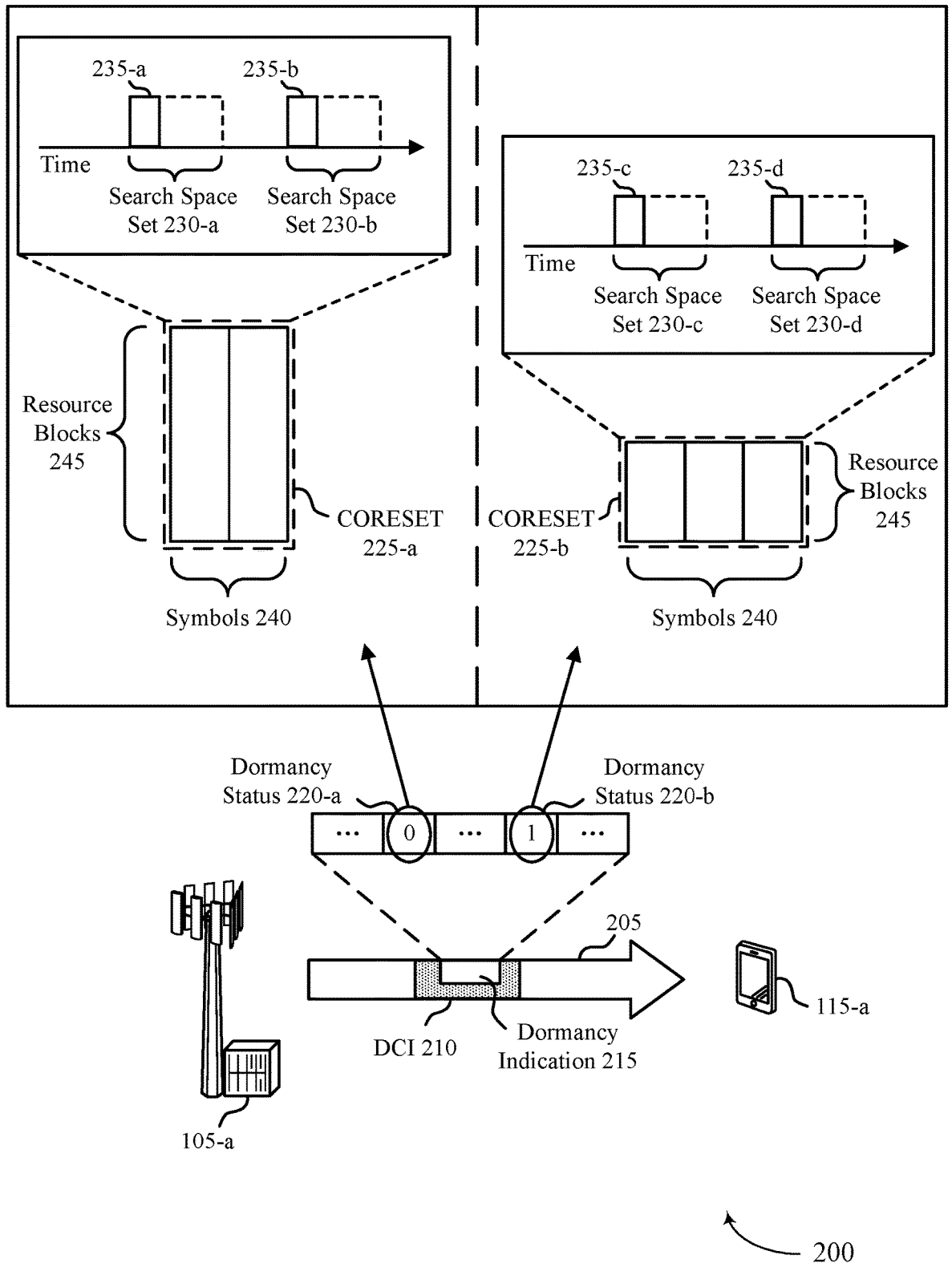

FIG. 2 illustrates an example of a wireless communications system 200 that supports CORESET 225 and search space set 230 dormancy indication via DCI 210 in accordance with aspects of the present disclosure. In some examples, the wireless communications system 200 may implement aspects of the wireless communications system 100. For example, the wireless communications system 200 may include a base station 105-a and a UE 115-a, which may be examples of corresponding devices described herein, including with reference to FIG. 1. In some examples, the base station 105-a may transmit, to the UE 115-a over a communication link 205, a dormancy indication 215 in DCI 210 (e.g., a DCI message) that indicates a dormancy status 220 of each of one or more control channel resources configured for the UE 115-a.

A control channel resource configured for the UE 115-a may equivalently refer to a CORESET 225 or a search space set 230 that is configured for the UE 115-a. For example, the UE 115-a may be configured with one or more CORESETs 225 that each provide a frequency-domain resource allocation and a time-domain resource allocation over which the UE 115-a may be scheduled for monitoring occasions (e.g., PDCCH monitoring occasions, such as resources over which the UE 115-a may receive control signaling from a base station 105). For example, a CORESET 225 may provide a number of resource blocks 245 in the frequency-domain and a number of consecutive symbols 240, which may be OFDM symbols 240, in the time-domain for PDCCH monitoring occasions. In some aspects, some CORESETs 225, such as a CORESET 225-a, may provide two symbols 240 for each PDCCH monitoring occasion while other CORESETs, such as a CORESET 225-b, may provide three symbols 240 for each PDCCH monitoring occasion. Further, a CORESET 225 may provide a different number of symbols 240, such as one symbol 240, based on RRC configuration.

Each CORESET 225 configured for the UE 115-a may be configured to be associated with one or more search space sets 230. Each search space set 230 configured for the UE 115-a may be configured to be associated with one CORESET 225. For example, one or more search space sets 230 may be allocated resources within a CORESET 225. As shown in FIG. 2, for instance, the CORESET 225-a may be associated with a search space set 230-a and a search space set 230-b and the CORESET 225-b may be associated with a search space set 230-c and a search space set 230-d. In some aspects, a search space set 230 may provide a periodicity and offset in slot and indicate slots in each period (e.g., a period based on the periodicity) for PDCCH monitoring occasions. Further, in some cases, each search space set 230 may be associated with a starting symbol 235 that indicates the start of a PDCCH monitoring occasion within a slot. As shown in FIG. 2, the search space set 230-a may be associated with a starting symbol of 235-a, the search space set 230-b may be associated with a starting symbol 235-b, the search space set 230-c may be associated with a starting symbol 235-c, and the search space set 230-d may be associated with a starting symbol 235-d. Accordingly, a CORESET 225 and the one or more search space sets 230 associated with the CORESET 225 (e.g., included within the resources provided by the CORESET 225) may jointly determine the time and frequency resources that the UE 115-a may use for monitoring for control signals from a base station 105.

In some cases, PDCCH monitoring may consume a large portion of the battery power of the UE 115-a and, therefore, reduction of unnecessary PDCCH monitoring may result in improved power savings and longer battery life of the UE 115-a. Such a reduction of unnecessary PDCCH monitoring may be done adaptatively by a UE 115-a and a base station 105-a based on the type or amount of data to be scheduled, data traffic levels, or a battery power of the UE 115-a. For example, if the UE 115-a or the base station 105-a, or both, determine that data is to be scheduled, the UE 115-a may actively monitor the control channel resources configured for the UE 115-a. Alternatively, if the UE 115-a or the base station 105-a, or both, determine that there is a lack of data or that data volume or traffic is low (e.g., lower than a threshold data volume), the UE 115-a may less actively monitor the control channel resources configured for the UE 115-a.

In some implementations of the present disclosure, the UE 115-a and the base station 105-a may accomplish such reduction of unnecessary PDCCH monitoring based on defining dormant and non-dormant operation modes for CORESETs 225 or search space sets 230, or both. For example, if a CORESET 225 or a search space set 230 is in a dormant operation mode, the UE 115-a may refrain from monitoring or reduce monitoring PDCCHs of the CORESET 225 or the search space set 230, respectively. Alternatively, if the CORESET 225 or the search space set 230 is in a non-dormant operation mode, the UE 115-a may monitor the CORESET 225 or the search space set 230, respectively. In some examples, the base station 105-a may indicate whether a CORESET 225 or a search space set 230 is in a dormant operation mode or in a non-dormant operation mode via a dormancy indication 215 in DCI 210 that provides a dormancy status 220 of each of one or more CORESETs 225 or one or more search space sets 230 (or of each of a combination of one or more CORESETs 225 and one or more search space sets 230). In some implementations, the UE 115-a and the base station 105-a may use such a dormancy indication 215 for control channel resources based on a capability of the UE 115-a.

In some aspects, the base station 105-a may transmit the dormancy indication 215 in DCI 210 that has a DCI format 0_1 or a DCI format of 1_1. In examples in which the DCI 210 has a DCI format 0_1 or a DCI format 1_1, the DCI 210 may provide the dormancy indication 215 for one or more CORESETs 225 or one or more search space sets 230, or both, and also provide scheduling information for uplink or downlink data. Alternatively, in some other examples in which the DCI 210 has a DCI format 1_1, the DCI 210 may provide the dormancy indication 215 for one or more CORESETs 225 or one or more search space sets 230, or both, and may not provide scheduling information for downlink data.

In some examples, the dormancy indication 215 may include a set of bits and each bit of the set of bits may provide a dormancy status 220 for a CORESET 225 or a search space set 230. In some implementations, the DCI 210 may convey an indication of the dormancy status 220 of one or more CORESETs 225 or one or more search space sets 230, or both, exclusive of a dormancy status 220 of one or more SCells. In such implementations, the dormancy indication 215 dedicated to providing a dormancy status 220 of CORESETs 225 or search space sets 230 may include up to all of the bits that are available for the dormancy indication 215. In other words, the base station 105-a may configure a value of each bit of the set of bits in the dormancy indication 215 to provide a dormancy status 220 of a CORESET 225 or a search space set 230 without reserving any of the bits in the dormancy indication 215 for indicating a dormancy status 220 of an SCell.

In examples in which the DCI 210 includes a dormancy indication 215 for one of the control channel resources configured for the UE 115-a or the SCells configured at the UE 115-a, and not for both, the base station 105-a may indicate whether the dormancy indication 215 is for control channel resources or SCells based on setting a value of a bit in the DCI 210. In some examples, such as in examples in which the DCI 210 has a DCI format 0_1 or a DCI format 1_1 and schedules data, the bit may be one of the bits within the dormancy indication 215. For example, in such examples of a DCI format 0_1 or a DCI format 1_1 that schedules data in addition to including the dormancy indication 215, the base station 105-*a* may use one of a quantity of bits (e.g., five bits) that are appended to the DCI 210 to indicate whether the dormancy indication 215 is for control channel resources or for SCells. In some other examples, such as in examples in which the DCI 210 has a DCI format 1_1 and does not schedule data, the bit may be one of the bits outside of the dormancy indication 215. For example, in such examples of a DCI format 1_1 that does not schedule data in addition to providing the dormancy indication 215, the base station 105-*a* may use one of at least two bits that are not used for the dormancy indication 215 (e.g., bits that may not be otherwise used for indicating a dormancy status 220 of an SCell). Additional details relating to the dormancy indication 215 are described herein, including with reference to FIG. 3.

Alternatively, in some other examples, the dormancy indication 215 may provide a dormancy status 220 of one or more CORESETs 225 or search space sets 230, or both, and a dormancy status 220 of one or more SCells. For example, the set of bits included in the dormancy indication 215 may include bits that may be used to indicate a dormancy status 220 for either a control channel resource or an SCell. As such, the set of bits in the dormancy indication 215 may be partitioned into two different sets of bits, where a first set of bits may be used to indicate a dormancy status 220 of control channel resources and a second set of bits may be used to indicate a dormancy status 220 of SCells. In such examples, the base station 105-*a* may configure the dormancy indication 215 to share bits between the dormancy status 220 of control channel resources and the dormancy status 220 of SCells. Additionally, in such examples, the base station 105-*a* may configure the sharing of the bits between the first set of bits and the second set of bits such that a total of the first set of bits and the second set of bits is less than or equal to an upper limit (e.g., a maximum) quantity of bits that are available for the dormancy indication 215 in the DCI 210.

In examples in which the dormancy indication 215 includes a first set of bits indicative of a dormancy status 220 for CORESETs 225 or search space sets 230, or both, and a second set of bits indicative of a dormancy status 220 for SCells, the base station 105-*a* may organize the placement of the first set of bits and the second set of bits in various ways. In some implementations, for example, the base station 105-*a* may map the first set of bits in the dormancy indication 215 that indicate a dormancy status 220 of control channel resources before the second set of bits in the dormancy indication 215 that indicate a dormancy status 220 of SCells (e.g., the first set of bits may precede the second set of bits in the dormancy indication 215 and in the DCI 210). In some other implementations, the base station 105-*a* may map the second set of bits in the dormancy indication 215 that indicate a dormancy status 220 of SCells before the first set of bits in the dormancy indication 215 that indicate a dormancy status 220 of control channel resources (e.g., the second set of bits may precede the first set of bits in the dormancy indication 215 and in the DCI 210).

To support mutual understanding between the UE 115-*a* and the base station 105-*a* of the dormancy status 220 provided by the dormancy indication 215 in the DCI 210, the base station 105-*a* may configure a correspondence (e.g., an association relationship, such as a mapping) between the DCI fields or bits that carry the indication of the dormancy status 220 of the CORESETs 225 or search space sets 230, or both, and the corresponding CORESETs 225 or search space sets 230, or both. For example, the base station 105-*a* may transmit, to the UE 115-*a*, a configuration for mapping the set of bits included in the dormancy indication 215 to the one or more CORESETs 225 or the one or more search space sets 230, or both, configured for the UE 115-*a*. In some aspects, the base station 105-*a* may transmit the configuration to the UE 115-*a* via higher layer signaling, such as RRC signaling. For example, the UE 115-*a* and the base station 105-*a* may use an RRC configured table to map bit indexes in the dormancy indication 215 to control channel resources configured for the UE 115-*a*. In some other aspects, the configuration for mapping the control channel resources configured for the UE 115-*a* to the bit indexes in the dormancy indication 215 may be implicit, or may be pre-configured or pre-defined, such as by a specification.

In some examples, the configuration may map each CORESET 225 or each search space set 230, or both, of the one or more CORESETs 225 or search space sets 230 configured for the UE 115-*a* to a single bit in the dormancy indication. In such examples, the base station 105-*a* may configure which CORESETs 225 or which search space sets 230, or both, may have a corresponding dormancy status 220 provided by the dormancy indication 215 and the configuration for mapping may indicate a correspondence between each bit of the dormancy indication 215 and an identifier of each CORESET 225 or search space set 230 of the configured CORESETs 225 or search space sets 230.

For example, based on the correspondence, the UE 115-*a* may determine that a first bit in the dormancy indication 215 may indicate a dormancy status 220-*a* of a first control channel resource (which may be any of the CORESET 225-*a*, the search space set 230-*a*, or the search space set 230-*b*) and that a second bit in the dormancy indication 215 may indicate a dormancy status 220-*b* of a second control channel resource (which may be any of the CORESET 225-*b*, the search space set 230-*c*, or the search space set 230-*d*). In some implementations, the correspondence between the set of bits included in the dormancy indication 215 and the one or more control channel resources configured for the UE 115-*a* may be based on an indexing of the set of bits in the dormancy indication 215 and an ordering of the one or more control channel resources. For instance, the configuration for mapping the set of bits in the dormancy indication 215 to the one or more control channel resources may indicate that each bit index (e.g., a location of a bit in the dormancy indication 215 or in the DCI 210) corresponds sequentially to the control channel resources according to the ordering of the control channel resources. For example, a firstly indexed bit of the set of bits (e.g., the foremost bit in the dormancy indication 215) may indicate a dormancy status 220 of a firstly ordered control channel resource, a secondly indexed bit of the set of bits (e.g., the bit immediately after to the firstly indexed bit) may indicate a dormancy status 220 of a secondly ordered control channel resource, and so on.

In some examples, the UE 115-*a* and the base station 105-*a* may order the one or more control channel resources according to an identifier associated with each of the one or more control channel resources. In some implementations, for example, the UE 115-*a* and the base station 105-*a* may order the control channel resources according to their identifiers from lowest identifier to highest identifier. In such implementations, a first index associated with a first bit in the dormancy indication 215 may correspond to a first control channel resource associated with the lowest identifier and a last index associated with a last bit in the dormancy indication 215 may correspond to a second control channel resource associated with the highest identifier. In some other implementations, the UE 115-*a* and the base station 105-*a* may order the control channel resources according to their identifiers from highest identifier to lowest identifier. In such implementations, the first index associated with the first bit in the dormancy indication 215 may correspond to the second control channel resource associated with the highest identifier and the last index associated with the last bit in the dormancy indication 215 may correspond to the first control channel resource associated with the lowest identifier. For example, as shown in FIG. 2, a bit indicative of the dormancy status 220-*a* of a first control channel resource may precede a bit indicative of the dormancy status 220-*b* of a second control channel resource and, accordingly, the first control channel resource may be associated with a lower identifier or a higher identifier than the second control channel resource depending on the implementation.

In some other examples, the base station 105-*a* may transmit, to the UE 115-*a*, an indication of the control channel resources configured for the UE 115-*a* in a network signaling message. In such examples, the base station 105-*a* may determine the ordering of the control channel resources and transmit the indication of the control channel resources in the network signaling message based on the determined ordering. Likewise, upon receiving the network signaling message, the UE 115-*a* may determine the ordering of the control channel resources based on the indication of the control channel resources in the network signaling message. In some examples, the network signaling message may be an example of an RRC signaling message.

In examples in which the dormancy indication 215 indicates a dormancy status 220 for both CORESETs 225 and search space sets 230, the UE 115-*a* and the base station 105-*a* may determine an ordering of the CORESETs 225 with respect to the search space sets 230. In such examples, the dormancy indication 215 may include a first subset of bits associated with the CORESETs 225 configured for the UE 115-*a* and a second subset of bits associated with the search space sets 230 configured for the UE 115-*a*. In some implementations, the UE 115-*a* and the base station 105-*a* may determine to order the CORESETs 225 before the search space sets 230. Accordingly, in such implementations, the base station 105-*a* may construct the dormancy indication 215 in the DCI 210 such that the first subset bits that are mapped to CORESETs 225 are placed before the second subset of bits that are mapped to search space sets 230. In some other implementations, the UE 115-*a* and the base station 105-*a* may determine to order the CORESETs 225 after the search space sets 230. Accordingly, in such implementations, the base station 105-*a* may construct the dormancy indication 215 in the DCI 210 such that the first subset bits that are mapped to CORESETs 225 are placed after the second subset of bits that are mapped to search space sets 230.

In some other examples, the configuration of the mapping may map a group of CORESETs 225 or a group of search space sets 230 to a single bit in the dormancy indication 215. In such examples, the base station 105-*a* may provide a dormancy status 220 of a group of CORESETs 225 or a group of search space sets 230 with each bit included in the dormancy indication 215. In some implementations, the base station 105-*a* may configure the quantity of CORESET groups or search space set groups, or both, of which the dormancy indication 215 may indicate a dormancy status 220 (e.g., the quantity of CORESET groups or search space set groups that can be indicated by the DCI 210). The base station 105-*a* may configure which CORESETs 225 are included within each CORESET group or which search space sets 230 are included within each search space set group, or both, based on configuring CORESET or search space set identifiers with each group. In some aspects, the base station 105-*a* may provide such configuration of the CORESET 225 or search space set 230 groups via higher layer signaling, such as RRC signaling, or via lower layer signaling, such as DCI 210. Further, although described herein in the context of ordering individual control channel resources, the UE 115-*a* and the base station 105-*a* may employ similar or equivalent techniques to determine an ordering of control channel resource groups. For example, the UE 115-*a* and the base station 105-*a* may determine an ordering of control channel resource groups based on an identifier associated with the control channel resource group or based on an identifier of one of the control channel resources of each control channel resource group. Alternatively, the base station 105-*a* may include an indication of an ordering of control channel resource groups in the network signaling message providing the indication of the control channel resources and the UE 115-*a* may determine the ordering of the control channel resource groups based on the indication in the network signaling message.

Upon determining the correspondence between each bit in the dormancy indication 215 and each CORESET 225 (or group of CORESETs 225) or each search space set 230 (or group of search space sets 230), the UE 115-*a* may determine the dormancy status 220 of each CORESET 225 (or group of CORESETs 225) or each search space set 230 (or group of search space sets 230) based on determining a value of a corresponding bit in the dormancy indication 215. In some implementations, the UE 115-*a* may interpret a bit value of 0 to indicate a dormancy status 220 of dormant (e.g., no PDCCH monitoring) and may interpret a bit value of 1 to indicate a dormancy status 220 of non-dormant (e.g., monitor PDCCH).

For example, the UE 115-*a* may determine that a first control channel resource (e.g., the CORESET 225-*a*, the search space set 230-*a*, or the search space set 230-*b*) or a first control channel resource group (e.g., including at least one of the CORESET 225-*a*, the search space set 230-*a*, or the search space set 230-*b*) has a dormancy status 220-*a* of being dormant based on determining that a corresponding bit has a value of 0 and, as such, may refrain from monitoring the first control channel resource or the first control channel resource group. For further example, the UE 115-*a* may determine that a second control channel resource (e.g., the CORESET 225-*b*, the search space set 230-*c*, or the search space set 230-*d*) or a second control channel resource group (e.g., including at least one of the CORESET 225-*b*, the search space set 230-*c*, or the search space set 230-*d*) has a dormancy status of 220-*b* of being non-dormant based on determining that a corresponding bit has a value of 1 and, as such, may monitor the second control channel resource or the second control channel resource group. Alternatively, in some other implementations, the UE 115-*a* may interpret a bit value of 0 to indicate a dormancy status 220 of being non-dormant (e.g., monitor PDCCH) and may interpret a bit value of 1 to indicate a dormancy status 220 of being dormant (e.g., no PDCCH monitoring).

In some further implementations, the UE 115-*a* may interpret the value of the bits in the dormancy indication 215 as an indication of whether the dormancy status 220 of a corresponding control channel resource (or group) has changed. In some examples, for instance, the UE 115-*a* may interpret a bit value of 0 to indicate that the dormancy status 220 of the corresponding control channel resource (or group) remains the same (e.g., no change in current PDCCH monitoring behavior) and may interpret a bit value of 1 to indicate that the dormancy status 220 of the corresponding control channel resource (or group) changes (e.g., the UE 115-*a* may flip the current PDCCH monitoring behavior associated with the control channel resource or group).

For example, the UE 115-*a* may determine to maintain a current monitoring behavior (e.g., a current dormancy status 220-*a*) of a first control channel resource (e.g., the CORESET 225-*a*, the search space set 230-*a*, or the search space set 230-*b*) or a first control channel resource group (e.g., including at least one of the CORESET 225-*a*, the search space set 230-*a*, or the search space set 230-*b*) based on determining that a corresponding bit in the dormancy indication 215 has a value of 0. For further example, the UE 115-*a* may determine to change a current monitoring behavior (e.g., a current dormancy status 220-*b*) of a second control channel resource (e.g., the CORESET 225-*b*, the search space set 230-*c*, or the search space set 230-*d*) or a second control channel resource group (e.g., including at least one of the CORESET 225-*b*, the search space set 230-*c*, or the search space set 230-*d*) based on determining that a corresponding bit in the dormancy indication 215 has a value of 1. Alternatively, in some other examples, the UE 115-*a* may interpret a bit value of 1 to indicate that the dormancy status 220 of the corresponding control channel resource (or group) remains the same (e.g., no change in current PDCCH monitoring behavior) and may interpret a bit value of 0 to indicate that the dormancy status 220 of the corresponding control channel resource (or group) changes (e.g., the UE 115-*a* may flip the current PDCCH monitoring behavior associated with the control channel resource or group).

In examples in which the dormancy indication 215 indicates a dormancy status 220 for both CORESETs 225 and search space sets 230, and if the dormancy indication 215 indicates that a CORESET 225 is non-dormant, the UE 115-*a* may determine whether to monitor in a search space set 230 associated with the CORESET 225 based on whether the search space set 230 is indicated to be non-dormant or dormant. For example, the UE 115-*a* may determine that the CORESET 225-*a* is non-dormant and may determine whether to monitor the search space set 230-*a* based on the dormancy status 220 of the search space set 230-*a*. In examples in which the dormancy status 220 of the search space set 230-*a* is non-dormant, the UE 115-*a* may determine to monitor the search space set 230-*a* for control signals. In examples in which the dormancy status 220 of the search space set 230-*a* is dormant, the UE 115-*a* may determine to refrain from monitoring the search space set 230-*a*. Alternatively, in examples in which the dormancy indication 215 indicates that a CORESET 225 is dormant, the UE 115-*a* may determine to refrain from monitoring any associated search space set 230 (e.g., regardless of a dormancy status of an associated search space set 230). For example, the UE 115-*a* may determine that the CORESET 225-*a* is dormant and may accordingly determine to refrain from monitoring either of the search space set 230-*a* or the search space set 230-*b*. Further, in examples in which the dormancy indication 215 includes a dormancy status for CORESETs 225 and not for search space sets 230, the UE 115-*a* may similarly determine to refrain from monitoring any search space set 230 associated with a CORESET 225 indicated to be dormant.

The CORESETs 225 or search space sets 230, or both, for which the UE 115-*a* may apply such a dormancy indication 215 may vary depending on the implementation. In some implementations, for example, the UE 115-*a* may apply the CORESET 225 or search space set 230 dormancy indication 215 on CORESETs 225 or search space sets 230 of the serving cell on which the DCI 210 is received (e.g., a PCell or the base station 105-*a*). Such implementations may be applicable for self-scheduling of the serving cell. In some aspects, the UE 115-*a* may condition the application of the dormancy indication 215 to enable the UE 115-*a* to receive another DCI 210 (e.g., another DCI 210 that may switch CORESETs 225 or search space sets 230 to dormant or non-dormant). For example, once the base station 105-*a* indicates the UE 115-*a* to turn some CORESETs 225 or search space sets 230, or both, to dormant (either individually or in groups), the UE 115-*a* may preserve at least one CORESET 225 (of the serving cell) and one associated search space set 230 (e.g., an associated UE-specific search space set 230) as non-dormant regardless of whether the dormancy indication 215 indicated the search space set 230 to be dormant. In some examples, the base station 105-*a* may configure the UE 115-*a* to monitor for DCI 210 including a dormancy indication 215 over such a preserved search space set 230. In some aspects, the base station 105-*a* may provide such a configuration via higher layer signaling, such as RRC signaling, or via lower layer signaling, such as DCI 210.

In examples in which the CORESET 225 or search space set 230 dormancy indication 215 is applied to the same cell on which it was received, and if a number of (e.g., all) UE-specific search space sets 230 on the cell are dormant, the base station 105-*a* may switch some or all of the CORESETs 225 and search space sets 230 back to non-dormancy if data (e.g., unicast data) is scheduled by DCI 210 in a search space set 230 (e.g., a common search space set 230). For example, in some implementations, all dormant CORESETs 225 and search space sets 230 are switched back to non-dormant. In some other implementations, a set of one or more CORESETs 225 and search space sets 230 are switched back to non-dormancy. In some aspects, the base station 105-*a* may switch all or a set of dormant CORESETs 225 and search space sets 230 to non-dormant based on a traffic volume. In such implementations, the base station 105-*a* may configure such a set of CORESETs 225 and search space sets 230 at the UE 115-*a* as a first set of non-dormant CORESETs 225 and search space sets 230. In some aspects, such a configuration of the first set of non-dormant CORESETs 225 and search space sets 230 may be provided to the UE 115-*a* from the base station 105-*a* via higher layer signaling, such as RRC signaling, or via lower layer signaling, such as DCI 210.

In some other implementations, the UE 115-*a* may apply the CORESET 225 or search space set 230 dormancy indication 215 on a second serving cell different than the serving cell from which the UE 115-*a* received the DCI 210. For example, the UE 115-*a* may apply the CORESET 225 or search space set 230 dormancy indication 215 on a second base station 105 different than the base station 105-*a* or on a second serving cell associated with the base station 105-*a*. In some examples, the UE 115-*a* may identify the second serving cell or the second base station 105 based on a carrier indicator field (CIF) in the DCI 210. Such implementations may be applicable to cross-carrier scheduling of the serving cell by DCI format received on the cell where the DCI 210 carrying the dormancy indication 215 is received. In such implementations in which the CORESET 225 or search space set 230 dormancy indication 215 is for a different cell or base station 105 than the serving cell (e.g., the base station 105-*a*) from which the DCI 210 was received, the UE 115-*a* may switch one or more (e.g., all) CORESETs 225 or search space sets 230, or both, to dormant (e.g., if the dormancy indication 215 indicates to do so).

In some other implementations, the UE 115-*a* may apply the CORESET 225 or search space set 230 dormancy indication 215 across serving cells. Such implementations may be applicable (e.g., useful) for cross-carrier scheduling applications because the PDCCH in a search space set 230 of a scheduled cell is monitored by the UE 115-*a* if (e.g., only if) another search space set 230 associated with the same identifier is actively monitored by the UE 115-*a* on the scheduling cell of this scheduled cell (e.g., where the DCI 210 carrying the dormancy indication 215 is received on the scheduling cell). In other words, the UE 115-*a* may monitor PDCCH within a scheduling cell search space set and a scheduled cell search space set if the two search space sets are associated with the same search space set identifier. As such, the base station 105-*a* (e.g., in the dormancy indication 215) may ignore identifiers associated with CORESETs 225 because the CORESET 225 indicates the frequency resource and the frequency resource is provided on the scheduling cell (e.g., the scheduled cell does not provide a frequency resource). Accordingly, the base station 105-*a* may use the identifiers associated with search space sets 230 on the scheduling cell to indicate that all corresponding search space sets 230 across multiple (e.g., all) scheduled cells (e.g., search space sets 230 associated with the same identifiers) are dormant or non-dormant.

As such, the UE 115-*a* may determine over which CORESETs 225 and search space sets 230 the UE 115-*a* may monitor for control signals, which the UE 115-*a* may receive from the base station 105-*a*, from a different base station 105 than the base station 105-*a* that transmits the DCI 210, or from multiple base stations 105.

Figure 3:
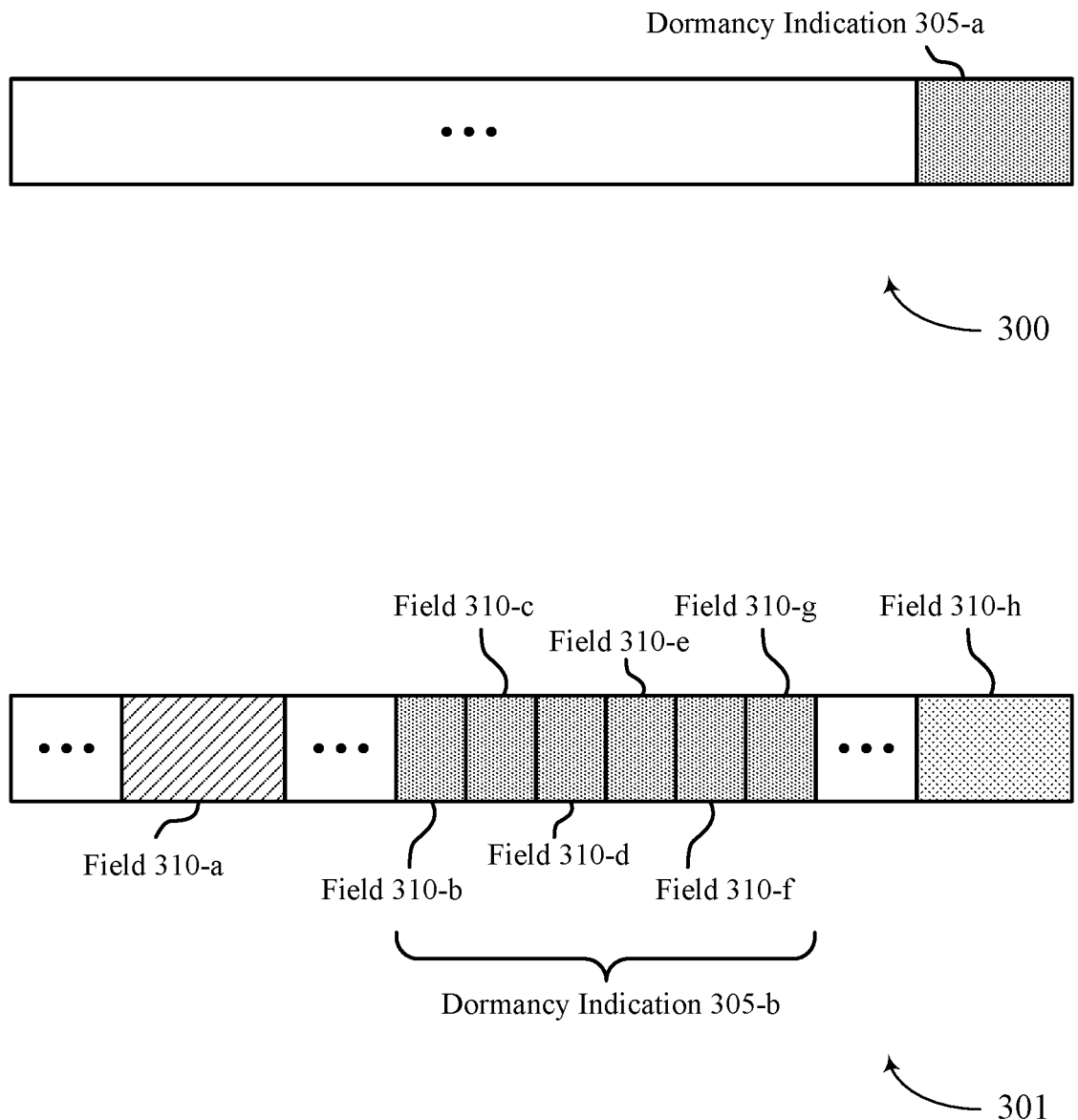
FIG. 3 illustrates example dormancy indication DCI that support CORESET and search space set dormancy indication via DCI in accordance with aspects of the present disclosure.

FIG. 3 illustrates example dormancy indication DCI 300 and 301 that support CORESET and search space set dormancy indication via DCI in accordance with aspects of the present disclosure. In some examples, the dormancy indication DCI 300 and 301 may be used to realize aspects of the wireless communications system 100 and the wireless communications system 200. For example, a base station 105 may transmit a dormancy indication DCI 300 or 301 to a UE 115 to indicate a dormancy status for each of one or more control channel resources configured for the UE 115, which may include one or more CORESETs or one or more search space sets, or both.

The dormancy indication DCI 300 illustrates an example of DCI having a DCI format 0_1 or a DCI format 1_1 that schedules uplink or downlink data in addition to including a dormancy indication 305-*a*. In some examples, the dormancy indication 305-*a* may be a bitmap appended to the end of the DCI that includes a quantity of bits. In some aspects, the bitmap may include up to five bits and the number of bits may be configured by the base station 105 in RRC signaling (e.g., via RRC signaling messages). In some implementations of the present disclosure, each bit in the dormancy indication 305-*a* may indicate a dormancy status for each of one or more control channel resources (either individually or in groups) configured for the UE 115. In some aspects, the dormancy indication 305-*a* may provide a dormancy status for up to five control channel resources or up to five groups of control channel resources. In some examples, one of the bits in the dormancy indication 305-*a* may include an indication of whether the dormancy indication 305-*a* conveys a dormancy status for control channel resources (e.g., CORESETs or search space sets, or both) or SCells.

The dormancy indication DCI 301 illustrates an example of DCI having a DCI format 1_1 that does not schedule downlink data in addition to including a dormancy indication 305-*b*. In some examples, a UE 115 may identify that dormancy indication DCI 301 does not schedule downlink data based on the bits included in the field 310-*a*, which may be an example of an FDRA field. For example, to signal that the dormancy indication DCI 301 does not schedule downlink data, and instead includes one or more repurposed fields conveying the dormancy indication 305-*b*, the base station 105 may construct the FDRA field as including either all 0's or all 1's. In examples in which the dormancy indication DCI 301 does not schedule downlink data, the base station 105 may append a number of reserved bits (e.g., up to five bits) to the end of the dormancy indication DCI 301, as illustrated by a field 310-*h*. Such appending of reserved bits to the end of the dormancy indication DCI 301 may size-align the dormancy indication DCI 301 that does not schedule downlink data with the dormancy indication DCI 300 that does schedule downlink data.

The dormancy indication DCI 301 may include a number of fields that may be repurposed to convey the dormancy indication 305-*b*, each field allocating a number of bits to the dormancy indication 305-*b*. In some examples, the base station 105 may repurpose a field 310-*b*, which may be an example of a modulation and coding scheme (MCS) field including five bits, a field 310-*c*, which may be an example of a new data indicator (NDI) field including one bit, a field 310-*d*, which may be an example of a redundancy version (RV) field including two bits, a field 310-*e*, which may be an example of a HARQ process number field including four bits, and a field 310-*f*, which may be an example of an antenna ports field including at least four bits. As such, the dormancy indication 305-*b* may have at least 16 bits available for conveying a dormancy status for control channel resources, and at least 17 bits in examples in which the dormancy indication 305-*b* additionally includes a field 310-*g*, which may be an example of a demodulation reference signal (DMRS) sequence initialization field including one bit.

Further, in some cases, the base station 105 may RRC configure additional bits that may be used by the dormancy indication 305-*b*. In some aspects, the dormancy indication 305-*b* may include up to 15 bits to indicate a total of 15 CORESETs and search space sets, which may be sufficient for the upper limit (e.g., the maximum number) of search space sets (e.g., 10) and CORESETs (e.g., 5) that may be used in an active BWP. As such, the dormancy indication DCI 301 may include at least two bits that are unused by the dormancy indication 305-*b*. In some examples, the base station 105 may use one or more of the at least two unused bits to indicate whether the dormancy indication 305-*b* indicates a dormancy status for control channel resources or for SCells.

Figure 4:
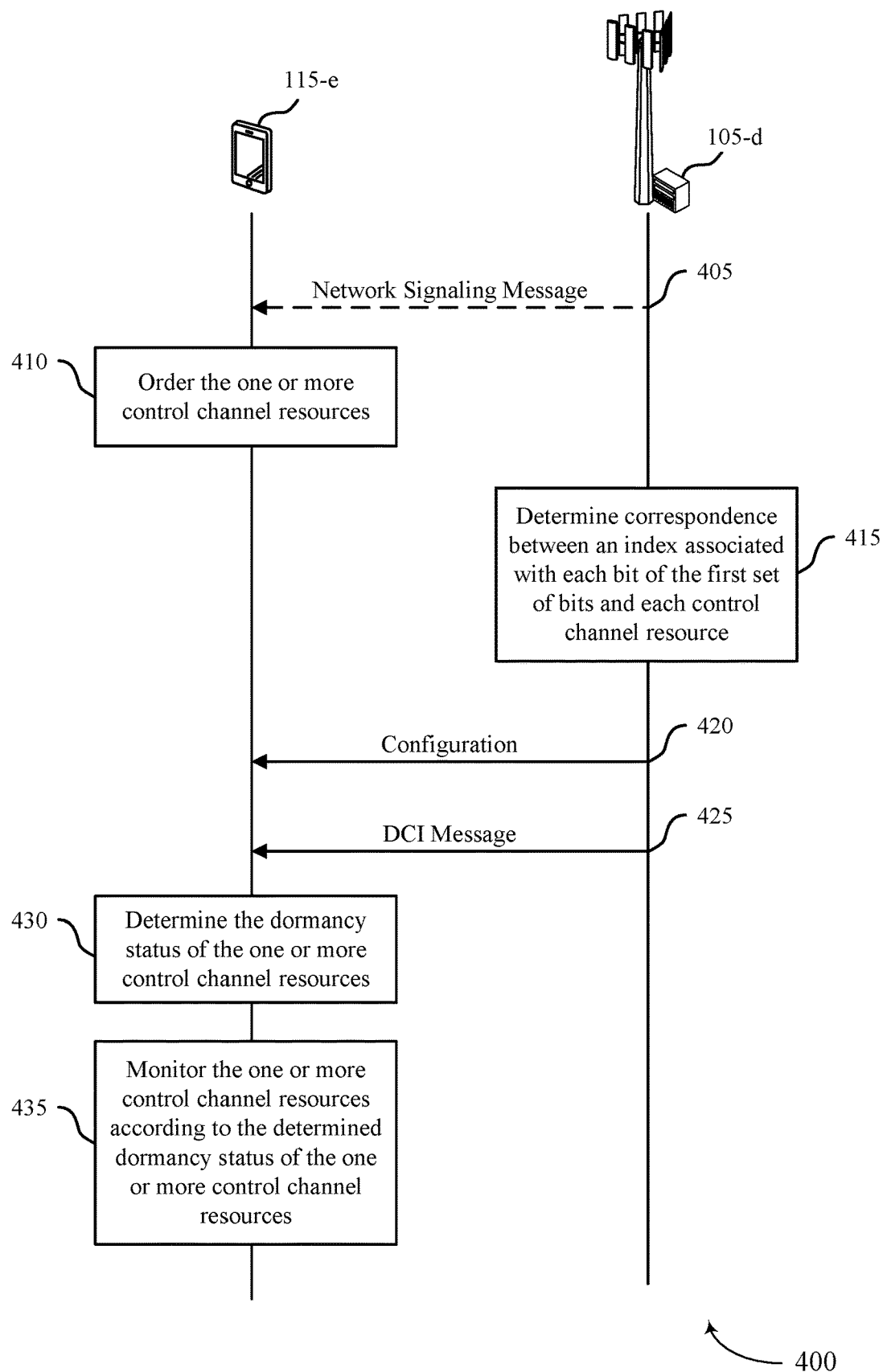
FIG. 4 illustrates an example of a process flow that supports CORESET and search space set dormancy indication via DCI in accordance with aspects of the present disclosure.

FIG. 4 illustrates an example of a process flow 400 that supports CORESET and search space set dormancy indication via DCI in accordance with aspects of the present disclosure. In some examples, the process flow 400 may implement aspects of the wireless communications system 100 and the wireless communications system 200. For example, the process flow 400 illustrates communication between a UE 115-*b* and a base station 105-*b*, which may be examples of corresponding devices described herein, including with reference to FIGS. 1 and 2. In some examples, the base station 105-*b* may transmit a dormancy indication to the UE 115-*b* via DCI that indicates a dormancy status for each of one or more control channel resources configured for the UE 115-*b*. Alternative examples of the process flow may be implemented, in which some features are performed in a different order than described or are not performed at all. In some examples, operations may include additional features not mentioned below, or further operations may be added.

At 405, the base station 105-*b* may, in some implementations, transmit a network signaling message including an indication of the one or more control channel resources to the UE 115-*b*. In some examples, the base station 105-*b* may determine an ordering of the one or more control channel resources and may transmit the indication of the one or more control channel resources in the network signaling message based on the determined ordering of the one or more control channel resources. For example, the base station 105-*b* may indicate the control channel resources in the network signaling message in an order that is based on the determined ordering of the control channel resources.

At 410, the UE 115-*b* may order the one or more control channel resources. In some examples, such as those in which the UE 115-*b* receives the network signaling message at 405 including the indication of the one or more control channel resources, the UE 115-*b* may order the one or more control channel resources based on the indication of the one or more control channel resources in the network signaling message. Additionally or alternatively, the UE 115-*b* may order the one or more control channel resources based on an identifier associated with each control channel resource. For example, the UE 115-*b* may determine an identifier associated with each control channel resource and order the control channel resources according to their associated identifiers. In some implementations, the UE 115-*b* may order the one or more control channel resources from a lowest identifier to a highest identifier. In some other implementations, the UE 115-*b* may order the one or more control channel resources from a highest identifier to a lowest identifier. Further, in examples in which the control channel resources include both CORESETs and search space sets, the UE 115-*b* may determine to order CORESETs before or after search space sets.

At 415, the base station 105-*b* may determine a correspondence between an index associated with each bit of the set of bits (e.g., the first set of bits) included in the dormancy indication and each control channel resource of the one or more control channel resources. In some examples, the correspondence between the index associated with each bit of the set of bits in the dormancy indication and each control channel resource is based on the ordering of the control channel resources.

At 420, the base station 105-*b* may transmit an indication of a configuration for mapping the one or more control channel resources to the first set of bits. In some examples, the UE 115-*b* may determine the correspondence between the bit indexes in the dormancy indication and the control channel resources based on the configuration for mapping the one or more control channel resources to the first set of bits. For example, based on the configuration for mapping, the UE 115-*b* may determine which bit in the dormancy indication indicates a dormancy status for a control channel resource. In some examples, the configuration for mapping the bits in the dormancy indication to the control channel resources may indicate that each bit in the dormancy indication corresponds to a single control channel resource. In some other examples, the configuration for mapping the bits in the dormancy indication to the control channel resources may indicate that each bit in the dormancy indication correspond to a group of control channel resources.

Additionally or alternatively, the configuration for mapping the bits in the dormancy indication to the control channel resources may indicate that bits providing a dormancy status of CORESETs precede bits providing a dormancy status of search space sets within the dormancy indication. Alternatively, the configuration for mapping the bits in the dormancy indication to the control channel resources may indicate that bits providing a dormancy status of search space sets precede bits providing a dormancy status of CORESETs within the dormancy indication. For example, the dormancy indication may include a first subset of bits mapped to CORESETs and a second subset of bits mapped to search space sets and, depending on the configuration for mapping the bits in the dormancy indication to the control channel resources, the first subset of bits mapped to CORESETs may be located before or after the second subset of bits mapped to search space sets within the dormancy indication.

At 425, the base station 105-*b* may transmit, to the UE 115-*b*, a DCI message including an indication (e.g., a dormancy indication) of a dormancy status of the one or more control channel resources configured for the UE 115-*b*. The dormancy indication may include the first set of bits and each bit of the first set of bits may map to a control channel resource (or to a group of control channel resources) according to the configured mapping or correspondence. In some examples, the DCI message may include a second indication (e.g., a second dormancy indication, which may be different than or within a larger dormancy indication field of the DCI message that also includes the dormancy status of the control channel resources) of a dormancy status of one or more cells (e.g., SCells). In such examples, the indication of the dormancy status of the one or more control channel resources may include a first set of bits (e.g., the first set of bits may be mapped to the control channel resources configured for the UE 115-*b*) and the second indication of the dormancy status of the one or more cells may include a second set of bits (e.g., the second set of bits may be mapped to the SCells configured for the UE 115-*b*). In some implementations, the first set of bits that are mapped to the control channel resources may precede the second set of bits that are mapped to the cells within the DCI message. In some other implementations, the second set of bits that are mapped to the cells may precede the first set of bits that are mapped to the control channel resources within the DCI message.

In some examples, the DCI message may convey the indication (e.g., the dormancy indication) of the dormancy status of the one or more control channel resources exclusive of a dormancy status of one or more cells (e.g., SCells). In such examples, the DCI message may indicate a dormancy status for either control channel resources or for SCells, but not both. In some implementations, the UE 115-*b* may determine whether the dormancy indication received in the DCI message is for the one or more control channel resources or for the one or more cells based on determining a value of a bit in the DCI message. In some aspects, the bit in the DCI message may be one of a quantity of bits that are appended to the DCI message to convey the indication of the dormancy status (e.g., if the DCI message also schedules uplink or downlink data). In some other aspects, the bit in the DCI message may be one of at least two bits in the DCI message that are not used (e.g., not repurposed) for conveying the dormancy indication (e.g., if the DCI message does not also schedule uplink or downlink data).

At 430, the UE 115-*b* may determine the dormancy status of the one or more control channel resources (e.g., of each of the one or more control channel resources) based on the indication (e.g., the dormancy indication) in the DCI message. In some examples, the dormancy indication may include the first set of bits and the UE 115-*b* may determine the dormancy status of the one or more control channel resources based on determining the value (e.g., either 0 or 1) of each bit and the configured correspondence or mapping between the first set of bits and the one or more control channel resources. For example, the UE 115-*b* may determine a value of a first bit of the first set of bits, the first bit associated with a first index in the dormancy indication (or in the DCI) that corresponds to a first control channel resource, and may determine the dormancy status of the first control channel resource based on the value of the first bit.

In some examples, the UE 115-*b* may determine that the first control channel resource is non-dormant. In such examples, the UE 115-*b* may monitor the first control channel resource. In some aspects, however, the UE 115-*b* may condition whether or not to monitor the first control channel resource based on whether the first control channel resource is a CORESET or a search space set. For example, if the first control channel resource is non-dormant and is a CORESET, the UE 115-*b* may monitor one or more associated search space sets according to a dormancy status for each of the one or more associated search space sets. If a search space set is non-dormant, or does not have an indicated dormancy status, the UE 115-*b* may monitor such a search space set within a non-dormant CORESET.

In some other examples, the UE 115-*b* may determine that the first control channel resource is dormant. In such examples, regardless of whether the first control channel resource is a CORESET or a search space set, the UE 115-*b* may refrain from monitoring the first control channel resource. For instance, in examples in which the first control channel resource is a CORESET, the UE 115-*b* may refrain from monitoring a search space set associated with the dormant CORESET. In some other examples, the UE 115-*b* may determine to maintain or change the dormancy status of the first control channel resource based on the value of the first bit.

At 435, the UE 115-*b* may monitor the one or more control channel resources for control signals according to the determined dormancy status of the one or more control channel resources. For example, the UE 115-*b* may determine to monitor or to refrain from monitoring a control channel resource based on the dormancy status of the control channel resource. In some examples, the UE 115-*b* may monitor the one or more control channel resources for control signals from the base station 105-*b*. In such examples, the UE 115-*b* may, regardless of the dormancy indication in the DCI message, preserve at least one control channel resource for receiving control signals from the base station 105-*b* (e.g., the base station 105-*b* may be a scheduling base station 105 for the UE 115-*b*). Additionally or alternatively, in such examples in which the UE 115-*b* monitors for control signals from the base station 105-*b*, the dormancy indication may indicate that at least a subset (some or all) of the one or more control channel resources are switched from dormant to non-dormant to enable the UE 115-*b* to monitor for scheduling DCI. For example, the UE 115-*b* may determine a data channel resource for receiving unicast data based on monitoring at least the subset of control channel resources that were switched to non-dormant and, accordingly, may receive unicast data over the data channel resource from the base station 105-*b*.

In some other examples, the UE 115-*b* may monitor for control signals from a second base station 105 different than the base station 105-*b*. In such examples, the UE 115-*b* may determine to monitor the one or more control channel resources for the control signals from the second base station 105 based on a CIF included in the DCI message. In some other examples, the UE 115-*b* may monitor for control signals from a plurality of base stations 105 including the base station 105-*b*. Further, although referred to herein as monitoring for control signals from base stations 105, the UE 115-*b* may equivalently monitor for control signals over the same cell on which the DCI message was received, over a different cell than the cell on which the DCI was received, or over multiple cells including the cell on which the DCI message was received.

Figure 5:
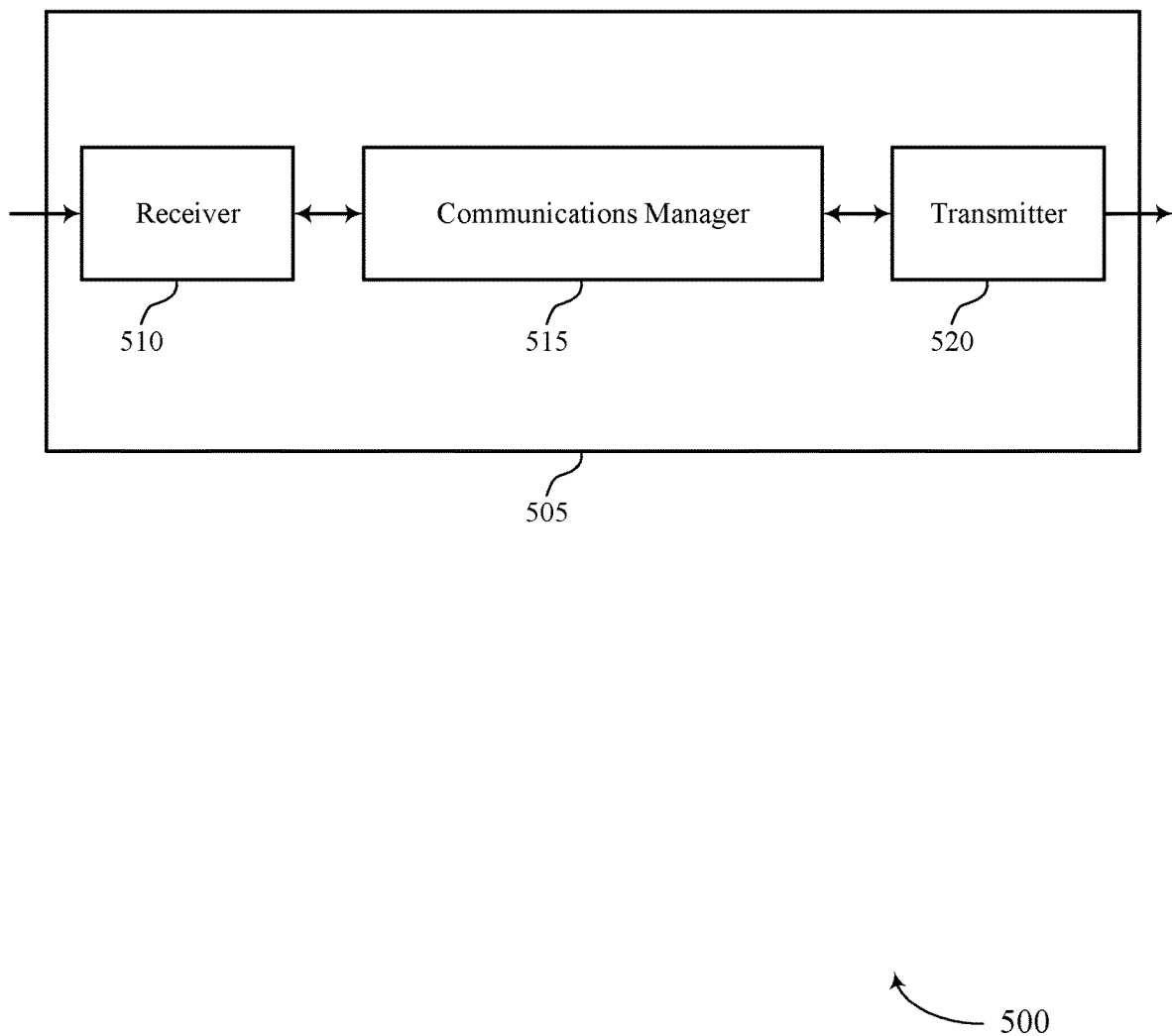
FIGS. 5 and 6 show block diagrams of devices that support CORESET and search space set dormancy indication via DCI in accordance with aspects of the present disclosure.

FIG. 5 shows a block diagram 500 of a device 505 that supports CORESET and search space set dormancy indication via DCI in accordance with aspects of the present disclosure. The device 505 may be an example of aspects of a UE 115 as described herein. The device 505 may include a receiver 510, a communications manager 515, and a transmitter 520. The device 505 may also include at least one processor. Each of these components may be in communication with one another (e.g., via one or more buses).

The receiver 510 may receive information such as packets, user data, or control information associated with various information channels (e.g., control channels, data channels, and information related to coreset and search space set dormancy indication via DCI). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a DCI message including an indication of a dormancy status of one or more control channel resources configured for the UE, determine the dormancy status of the one or more control channel resources based on the indication in the DCI message, and monitor the one or more control channel resources for control signals according to the determined dormancy status of the one or more control channel resources. The communications manager 515 may be an example of aspects of the communications manager 810 described herein.

The communications manager 515, or its sub-components, may be implemented in hardware, software (e.g., executed by at least one processor), or any combination thereof. If implemented in code executed by at least one processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (e.g., amplifiers, filters, antennas) coupled to the mobile device modem to enable wireless transmission and reception over one or more bands.

The communications manager 515 as described herein may be implemented to realize one or more potential advantages. In some implementations, the communications manager 515 may determine a dormancy status of one or more control channel resources configured for the device 505 based on receiving a dormancy indication from a base station in DCI. As such, the communications manager 515 may stop monitoring control channel resources (e.g., CORESETs or search space sets, or both) that are indicated as dormant while continuing to monitor control channel resources that are indicated as non-dormant. Accordingly, the communications manager 515 may adaptively monitor control channel resources, which may include or refer to PDCCH monitoring occasions, based on the traffic volume or the type of traffic (e.g., a priority of the traffic), which may enable the communications manager 515 to avoid unnecessary PDCCH monitoring. Further, such a dormancy indication for control channel resources may be used based on the battery power of the device 505 (e.g., more control channel resources may be indicated as dormant if the battery power of the device 505 falls below a threshold battery power). As a result, the communications manager 515 may avoid unnecessary PDCCH monitoring, which may improve power savings at the device 505 and increase the battery life of the device 505.

Figure 6:
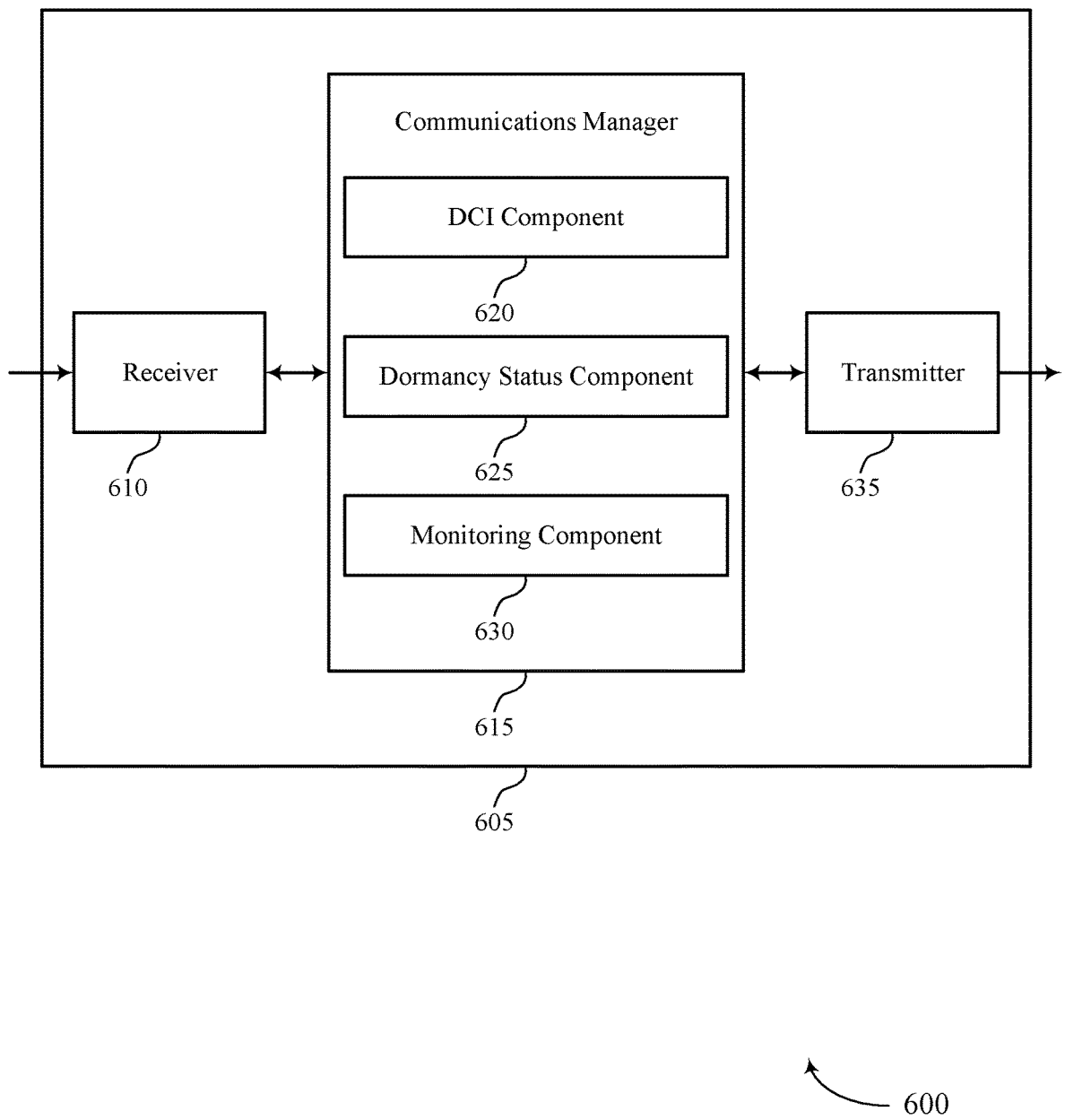

FIG. 6 shows a block diagram 600 of a device 605 that supports CORESET and search space set dormancy indication via DCI in accordance with aspects of the present disclosure. The device 605 may be an example of aspects of a device 505, or a UE 115 as described herein. The device 605 may include a receiver 610, a communications manager 615, and a transmitter 635. The device 605 may also include at least one processor. Each of these components may be in communication with one another (e.g., via one or more buses).

The receiver 610 may receive information such as packets, user data, or control information associated with various information channels (e.g., control channels, data channels, and information related to coreset and search space set dormancy indication via DCI). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a DCI component 620, a dormancy status component 625, and a monitoring component 630. The communications manager 615 may be an example of aspects of the communications manager 810 described herein.

The DCI component 620 may receive, from a base station, a DCI message including an indication of a dormancy status of one or more control channel resources configured for the UE. The dormancy status component 625 may determine the dormancy status of the one or more control channel resources based on the indication in the DCI message. The monitoring component 630 may monitor the one or more control channel resources for control signals according to the determined dormancy status of the one or more control channel resources.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
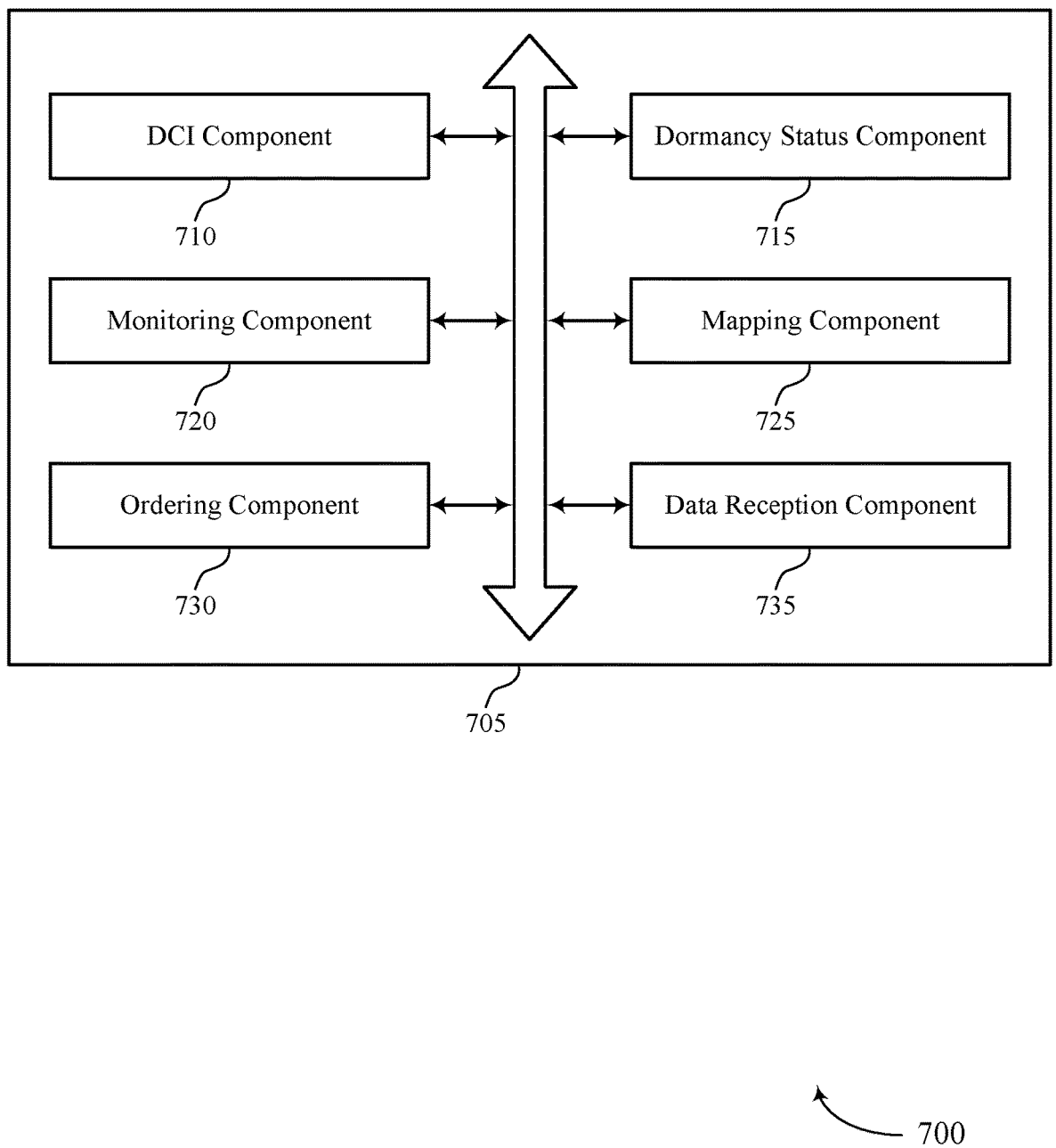
FIG. 7 shows a block diagram of a communications manager that supports CORESET and search space set dormancy indication via DCI in accordance with aspects of the present disclosure.

FIG. 7 shows a block diagram 700 of a communications manager 705 that supports CORESET and search space set dormancy indication via DCI in accordance with aspects of the present disclosure. The communications manager 705 may be an example of aspects of a communications manager 515, a communications manager 615, or a communications manager 810 described herein. The communications manager 705 may include a DCI component 710, a dormancy status component 715, a monitoring component 720, a mapping component 725, an ordering component 730, and a data reception component 735. Each of these modules may communicate, directly or indirectly, with one another (e.g., via one or more buses).

The DCI component 710 may receive, from a base station, a DCI message including an indication of a dormancy status of one or more control channel resources configured for the UE. In some examples, the DCI component 710 may determine that the indication of the dormancy status received in the DCI message is for the one or more control channel resources based on a value of a bit in the DCI message.

In some cases, the bit is one of a quantity of bits appended to the DCI message to convey the indication of the dormancy status. In some cases, the bit is one of at least two bits in the DCI message that are not used for the dormancy indication. In some cases, the DCI message conveys the indication of the dormancy status of the one or more control channel resources exclusive of a dormancy status of the one or more cells.

The dormancy status component 715 may determine the dormancy status of the one or more control channel resources based on the indication in the DCI message. In some examples, the dormancy status component 715 may determine a value of a first bit of the first set of bits, where a first index associated with the first bit corresponds to a first control channel resource of the one or more control channel resources. In some examples, the dormancy status component 715 may determine the dormancy status of the first control channel resource based on the value of the first bit.

In some examples, the dormancy status component 715 may determine that the first control channel resource is non-dormant. In some examples, the dormancy status component 715 may determine that the first control channel resource is dormant. In some examples, the dormancy status component 715 may determine to maintain the dormancy status of the first control channel resource.

In some examples, the dormancy status component 715 may determine to change the dormancy status of the first control channel resource. In some cases, the DCI message includes a second indication of a dormancy status of one or more cells, the indication including a first set of bits mapped to the one or more control channel resources and the second indication including a second set of bits mapped to the one or more cells.

The monitoring component 720 may monitor the one or more control channel resources for control signals according to the determined dormancy status of the one or more control channel resources. In some examples, the monitoring component 720 may monitor a search space set associated with the CORESET according to a second dormancy status of the search space set. In some examples, the monitoring component 720 may refrain from monitoring a search space set associated with the CORESET.

In some examples, the monitoring component 720 may monitor the one or more control channel resources for the control signals from the base station according to the determined dormancy status of the one or more control channel resources. In some examples, the monitoring component 720 may monitor at least one of the one or more control channel resources for the control signals from the base station, where the base station is a scheduling base station for the UE. In some examples, the monitoring component 720 may monitor the one or more control channel resources for the control signals from a second base station different than the first base station according to the determined dormancy status of the one or more control channel resources.

In some examples, the monitoring component 720 may determine to monitor the one or more control channel resources for the control signals from the second base station based on a CIF included in the DCI message. In some examples, the monitoring component 720 may monitor the one or more control channel resources for the control signals from a set of base stations that include the base station.

The mapping component 725 may receive, from the base station, an indication of a configuration for mapping the one or more control channel resources to the first set of bits. In some examples, the mapping component 725 may determine a correspondence between an index associated with each bit of the first set of bits and each control channel resource of the one or more control channel resources based on the configuration, where each bit of the first set of bits is associated with a different index.

In some cases, each bit of the first set of bits corresponds to a single control channel resource of the one or more control channel resources. In some cases, each bit of the first set of bits corresponds to a group of control channel resources of the one or more control channel resources. In some cases, the one or more control channel resources include one or more CORESETs and one or more search space sets, and where a first subset of the first set of bits are associated with the one or more CORESETs and a second subset of the first set of bits are associated with the one or more search space sets.

In some cases, the first subset of the first set of bits associated with the one or more CORESETs precede the second subset of the first set of bits associated with the one or more search space sets. In some cases, the second subset of the first set of bits associated with the one or more search space sets precede the first subset of the first set of bits associated with the one or more CORESETs.

In some cases, the first set of bits mapped to the one or more control channel resources precede the second set of bits mapped to the one or more cells. In some cases, the second set of bits mapped to the one or more cells precede the first set of bits mapped to the one or more control channel resources.

The ordering component 730 may determine an identifier associated with each control channel resource of the one or more control channel resources, where the correspondence between the index associated with each bit of the first set of bits and each control channel resource of the one or more control channel resources is based on an order of the identifier associated with each control channel resource. In some examples, the ordering component 730 may order the one or more control channel resources from a lowest identifier to a highest identifier, where a first index associated with a first bit of the first set of bits corresponds to a first control channel resource associated with the lowest identifier and a last index associated with a last bit of the first set of bits corresponds to a second control channel resource associated with the highest identifier.

In some examples, the ordering component 730 may order the one or more control channel resources from a highest identifier to a lowest identifier, where a first index associated with a first bit of the first set of bits corresponds to a first control channel resource associated with the highest identifier and a last index associated with a last bit of the first set of bits corresponds to a second control channel resource associated with the lowest identifier.

In some examples, the ordering component 730 may receive, from the base station, a network signaling message including an indication of the one or more control channel resources. In some examples, the ordering component 730 may determine the order of the one or more control channel resources based on the indication of the one or more control channel resources in the network signaling message.

The data reception component 735 may determine a data channel resource for receiving unicast data based on monitoring at least the subset of the one or more control channel resources. In some examples, the data reception component 735 may receive, from the base station, the unicast data over the data channel resource.

Figure 8:
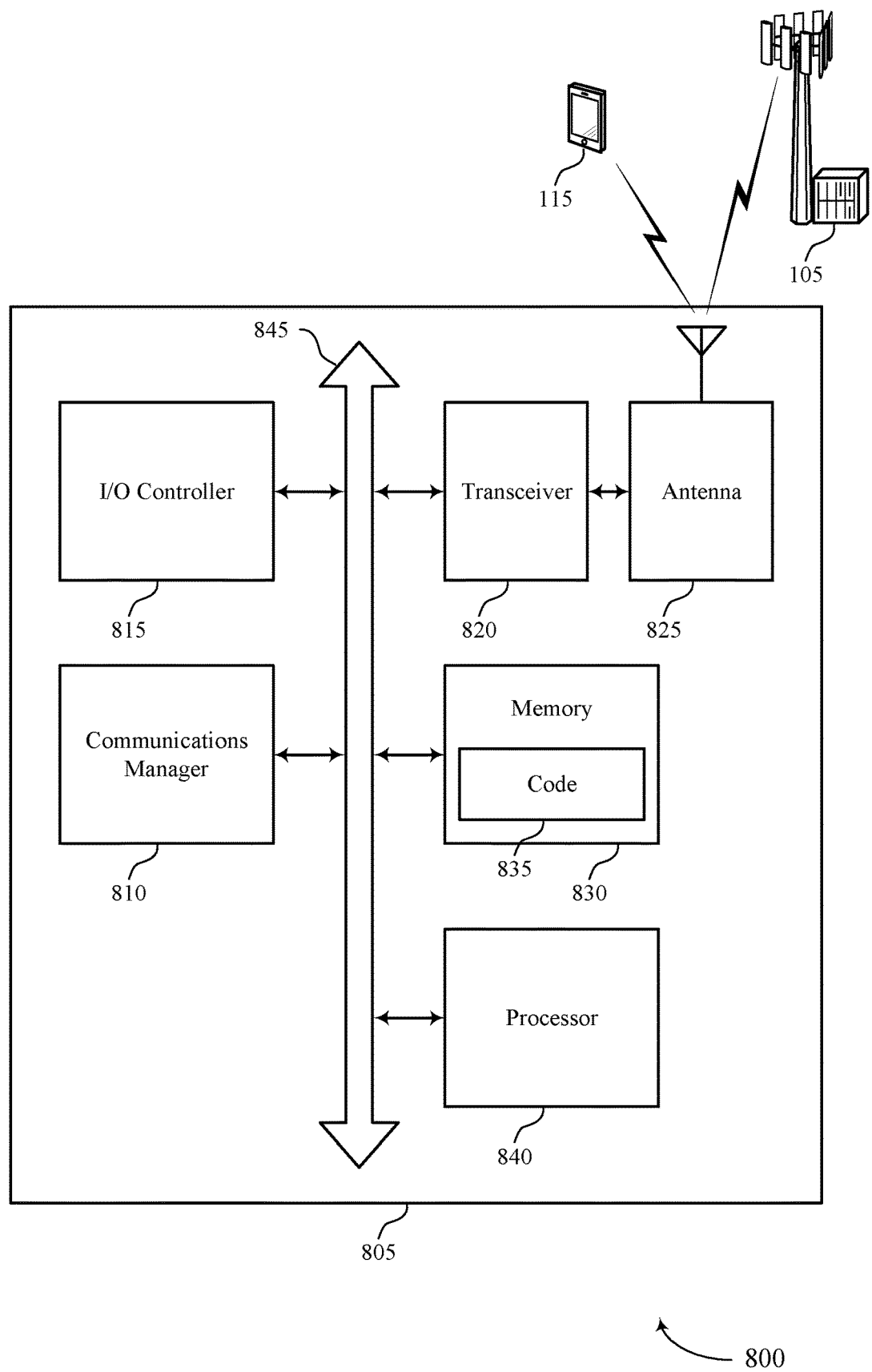
FIG. 8 shows a diagram of a system including a device that supports CORESET and search space set dormancy indication via DCI in accordance with aspects of the present disclosure.

FIG. 8 shows a diagram of a system 800 including a device 805 that supports CORESET and search space set dormancy indication via DCI in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a DCI message including an indication of a dormancy status of one or more control channel resources configured for the UE, determine the dormancy status of the one or more control channel resources based on the indication in the DCI message, and monitor the one or more control channel resources for control signals according to the determined dormancy status of the one or more control channel resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of at least one processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the at least one processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting coreset and search space set dormancy indication via DCI).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
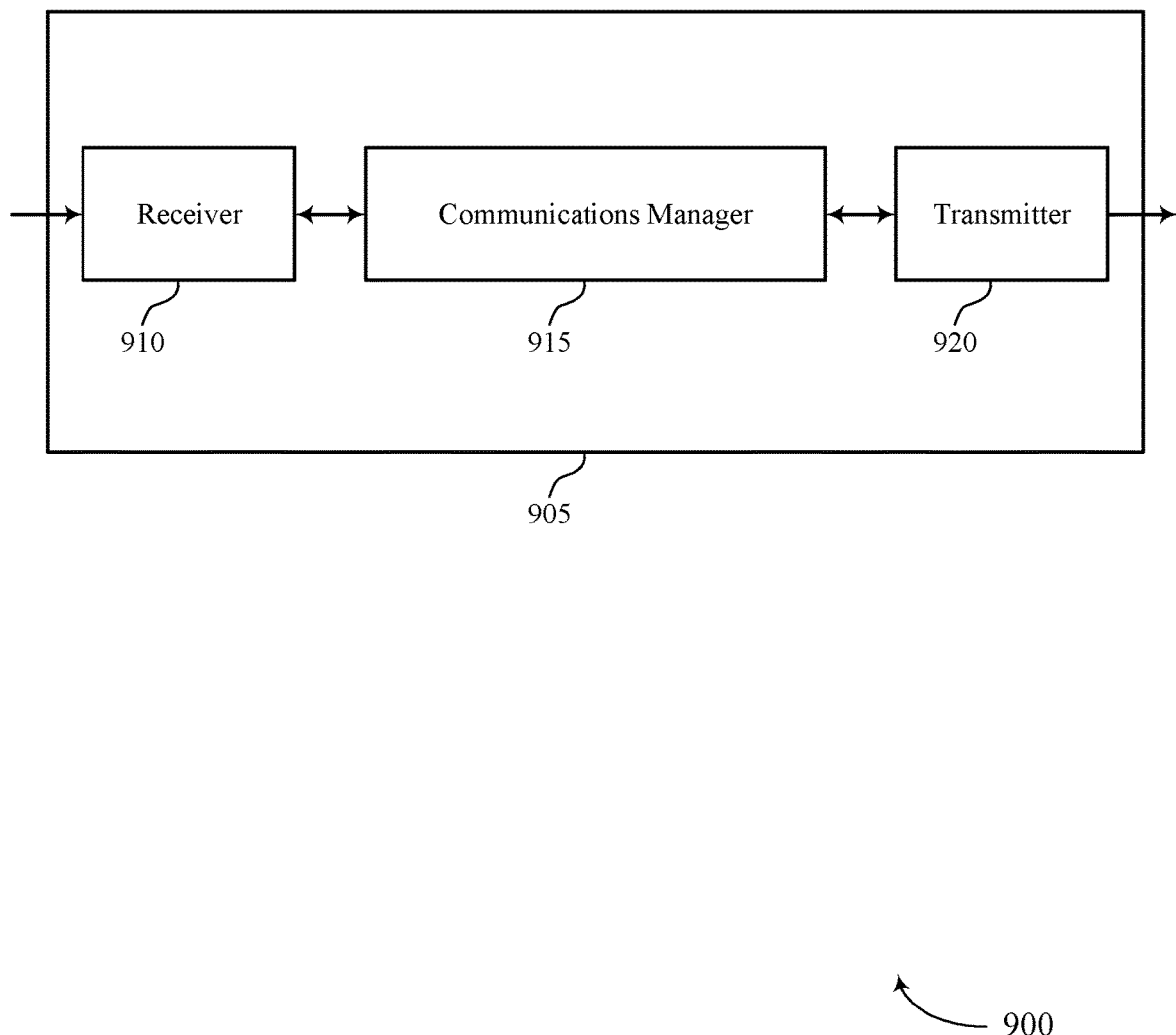
FIGS. 9 and 10 show block diagrams of devices that support CORESET and search space set dormancy indication via DCI in accordance with aspects of the present disclosure.

FIG. 9 shows a block diagram 900 of a device 905 that supports CORESET and search space set dormancy indication via DCI in accordance with aspects of the present disclosure. The device 905 may be an example of aspects of a base station 105 as described herein. The device 905 may include a receiver 910, a communications manager 915, and a transmitter 920. The device 905 may also include at least one processor. Each of these components may be in communication with one another (e.g., via one or more buses).

The receiver 910 may receive information such as packets, user data, or control information associated with various information channels (e.g., control channels, data channels, and information related to coreset and search space set dormancy indication via DCI). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a dormancy status of one or more control channel resources configured for a UE, transmit, to the UE, a DCI message including an indication of the dormancy status of the one or more control channel resources, and transmit, to the UE, control signals over the one or more control channel resources according to the determined dormancy status of the one or more control channel resources. The communications manager 915 may be an example of aspects of the communications manager 1210 described herein.

The communications manager 915, or its sub-components, may be implemented in hardware, software (e.g., executed by at least one processor), or any combination thereof. If implemented in code executed by at least one processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The communications manager 915 may be implemented to realize one or more potential advantages. In some implementations, the communications manager 915 may transmit a dormancy indication via DCI to a UE that indicates a dormancy status for each of one or more control channel resources (e.g., CORESETs or search space sets, or both) configured for the UE. As such, the communications manager 915 may adaptively (e.g., dynamically) configure which control channel resources a UE will monitor and which control channel resources the UE will refrain from monitoring. Accordingly, the communications manager 915 may assist the UE in avoiding unnecessary PDCCH monitoring, which may improve power savings at the UE and increase the battery life of the UE.

Figure 10:
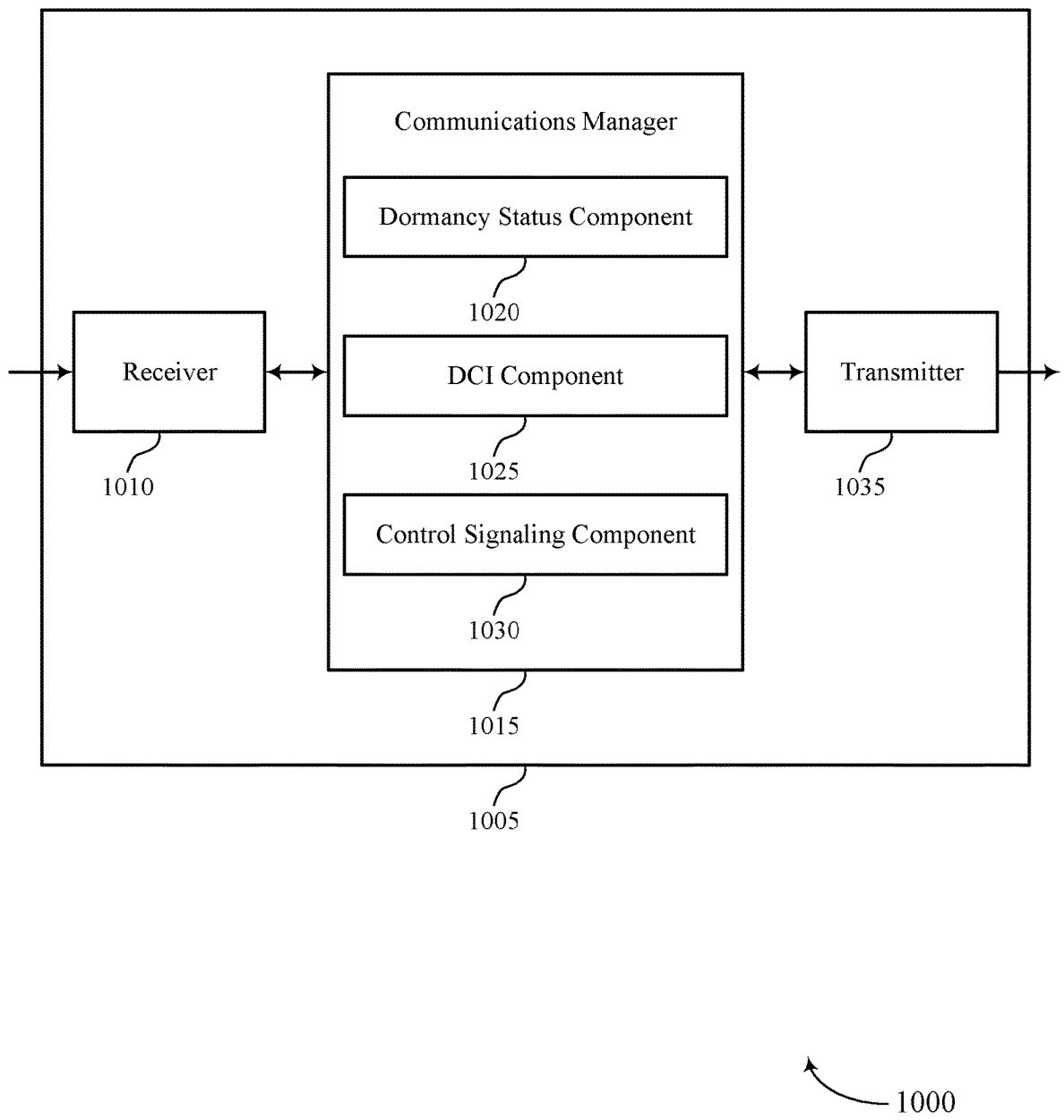

FIG. 10 shows a block diagram 1000 of a device 1005 that supports CORESET and search space set dormancy indication via DCI in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include at least one processor. Each of these components may be in communication with one another (e.g., via one or more buses).

The receiver 1010 may receive information such as packets, user data, or control information associated with various information channels (e.g., control channels, data channels, and information related to coreset and search space set dormancy indication via DCI). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a dormancy status component 1020, a DCI component 1025, and a control signaling component 1030. The communications manager 1015 may be an example of aspects of the communications manager 1210 described herein.

The dormancy status component 1020 may determine a dormancy status of one or more control channel resources configured for a UE. The DCI component 1025 may transmit, to the UE, a DCI message including an indication of the dormancy status of the one or more control channel resources. The control signaling component 1030 may transmit, to the UE, control signals over the one or more control channel resources according to the determined dormancy status of the one or more control channel resources.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
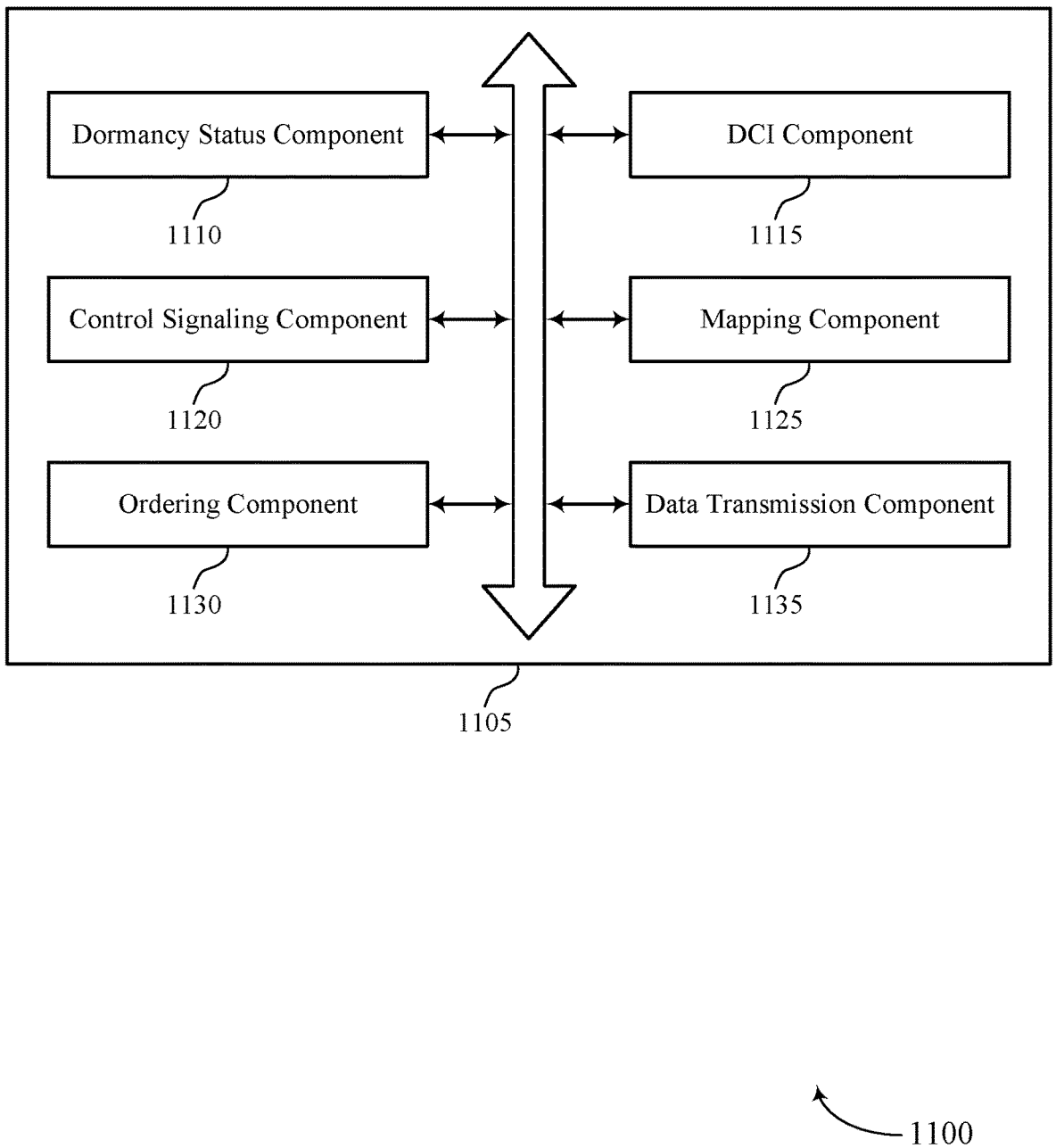
FIG. 11 shows a block diagram of a communications manager that supports CORESET and search space set dormancy indication via DCI in accordance with aspects of the present disclosure.

FIG. 11 shows a block diagram 1100 of a communications manager 1105 that supports CORESET and search space set dormancy indication via DCI in accordance with aspects of the present disclosure. The communications manager 1105 may be an example of aspects of a communications manager 915, a communications manager 1015, or a communications manager 1210 described herein. The communications manager 1105 may include a dormancy status component 1110, a DCI component 1115, a control signaling component 1120, a mapping component 1125, an ordering component 1130, and a data transmission component 1135. Each of these modules may communicate, directly or indirectly, with one another (e.g., via one or more buses).

The dormancy status component 1110 may determine a dormancy status of one or more control channel resources configured for a UE. In some examples, the dormancy status component 1110 may determine the dormancy status of a first control channel resource of the one or more control channel resources. In some examples, the dormancy status component 1110 may determine a value of a first bit of the first set of bits based on the dormancy status of the first control channel resource, where a first index associated with the first bit corresponds to the first control channel resource.

In some examples, the dormancy status component 1110 may determine that the first control channel resource is non-dormant. In some examples, the dormancy status component 1110 may determine that the first control channel resource is dormant. In some examples, the dormancy status component 1110 may determine to maintain the dormancy status of the first control channel resource.

In some examples, the dormancy status component 1110 may determine to change the dormancy status of the first control channel resource. In some examples, the dormancy status component 1110 may determine that the indication of the dormancy status is for the one or more control channel resources. In some cases, the DCI message includes a second indication of a dormancy status of one or more cells, the indication including a first set of bits mapped to the one or more control channel resources and the second indication including a second set of bits mapped to the one or more cells. In some cases, the one or more control channel resources include control channel resources associated with a set of base stations that include the base station.

The DCI component 1115 may transmit, to the UE, a DCI message including an indication of the dormancy status of the one or more control channel resources. In some examples, the DCI component 1115 may determine a value of a bit in the DCI message based on determining that the indication of the dormancy status is for the one or more control channel resources.

In some cases, the bit is one of a quantity of bits appended to the DCI message to convey the indication of the dormancy status. In some cases, the bit is one of at least two bits in the DCI message that are not used for the dormancy indication. In some cases, the DCI message conveys the indication of the dormancy status of the one or more control channel resources exclusive of a dormancy status of one or more cells.

The control signaling component 1120 may transmit, to the UE, control signals over the one or more control channel resources according to the determined dormancy status of the one or more control channel resources. In some examples, the control signaling component 1120 may transmit at least one control signal of the control signals over a search space set associated with the CORESET according to a second dormancy status of the search space set.

In some examples, the control signaling component 1120 may refrain from transmitting the control signals over a search space set associated with the CORESET. In some examples, the control signaling component 1120 may transmit the control signals over at least one of the one or more control channel resources, where the base station is a scheduling base station for the UE.

The mapping component 1125 may determine a correspondence between an index associated with each bit of the first set of bits and each control channel resource of the one or more control channel resources, where each bit of the first set of bits is associated with a different index. In some examples, the mapping component 1125 may transmit, to the UE, an indication of a configuration for mapping the one or more control channel resources to the first set of bits based on the correspondence.

In some cases, each bit of the first set of bits corresponds to a single control channel resource of the one or more control channel resources. In some cases, each bit of the first set of bits corresponds to a group of control channel resources of the one or more control channel resources. In some cases, the one or more control channel resources include one or more CORESETs and one or more search space sets, and where a first subset of the first set of bits are associated with the one or more CORESETs and a second subset of the first set of bits are associated with the one or more search space sets.

In some cases, the first subset of the first set of bits associated with the one or more CORESETs precede the second subset of the first set of bits associated with the one or more search space sets. In some cases, the second subset of the first set of bits associated with the one or more search space sets precede the first subset of the first set of bits associated with the one or more CORESETs. In some cases, the first set of bits mapped to the one or more control channel resources precede the second set of bits mapped to the one or more cells. In some cases, the second set of bits mapped to the one or more cells precede the first set of bits mapped to the one or more control channel resources.

The ordering component 1130 may determine an identifier associated with each control channel resource of the one or more control channel resources, where the correspondence between the index associated with each bit of the first set of bits and each control channel resource of the one or more control channel resources is based on an order of the identifier associated with each control channel resource. In some examples, the ordering component 1130 may order the one or more control channel resources from a lowest identifier to a highest identifier, where a first index associated with a first bit of the first set of bits corresponds to a first control channel resource associated with the lowest identifier and a last index associated with a last bit of the first set of bits corresponds to a second control channel resource associated with the highest identifier.

In some examples, the ordering component 1130 may order the one or more control channel resources from a highest identifier to a lowest identifier, where a first index associated with a first bit of the first set of bits corresponds to a first control channel resource associated with the highest identifier and a last index associated with a last bit of the first set of bits corresponds to a second control channel resource associated with the lowest identifier.

In some examples, the ordering component 1130 may determine the order of the one or more control channel resources. In some examples, the ordering component 1130 may transmit, to the UE, a network signaling message including an indication of the one or more control channel resources, where the indication of the one or more control channel resources in the network signaling message is based on the order.

The data transmission component 1135 may transmit, to the UE, an indication of a data channel resource over a control channel resource of at least the subset of control channel resources. In some examples, the data transmission component 1135 may transmit, to the UE, unicast data over the data channel resource.

Figure 12:
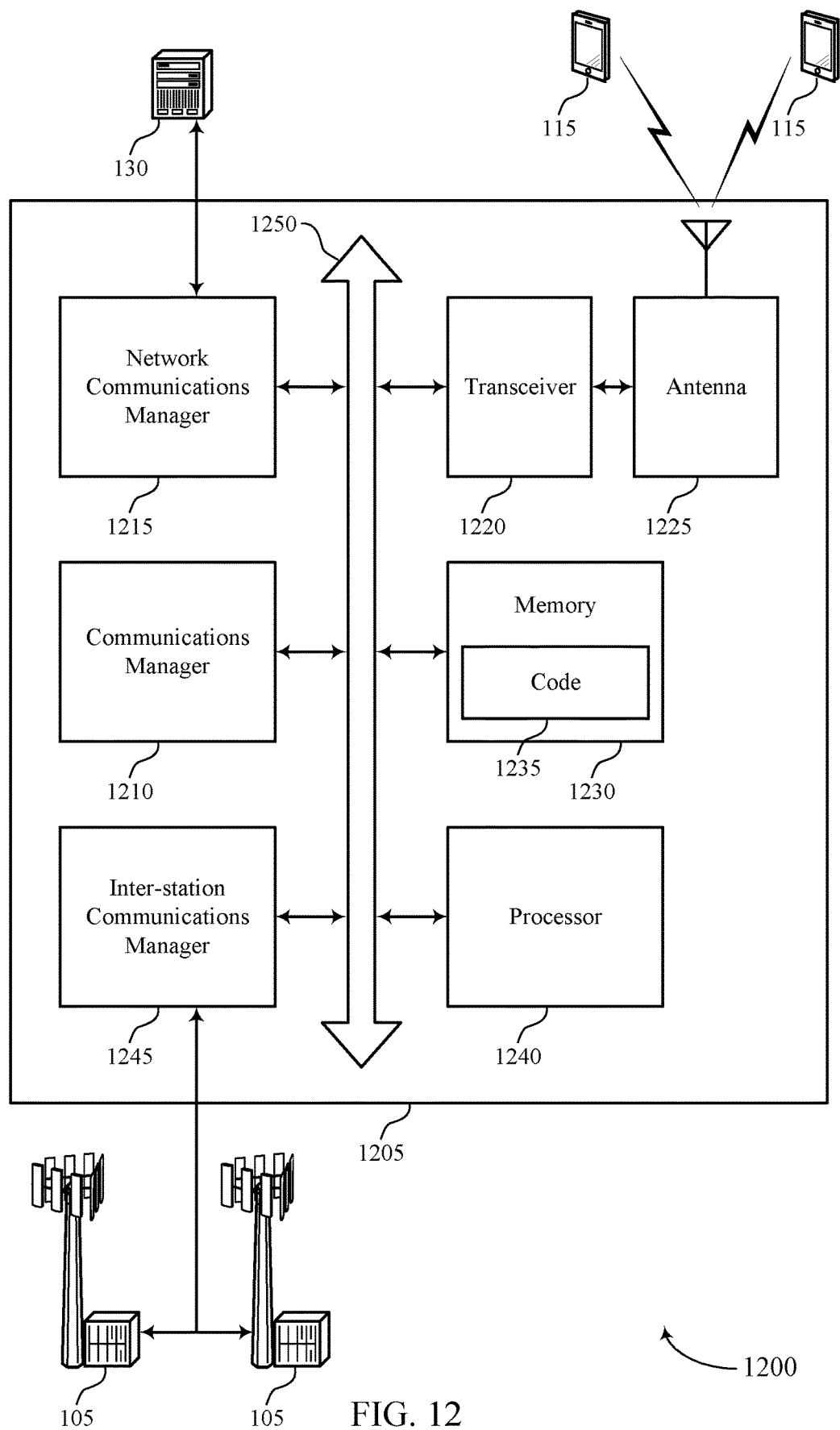
FIG. 12 shows a diagram of a system including a device that supports CORESET and search space set dormancy indication via DCI in accordance with aspects of the present disclosure.

FIG. 12 shows a diagram of a system 1200 including a device 1205 that supports CORESET and search space set dormancy indication via DCI in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a dormancy status of one or more control channel resources configured for a UE, transmit, to the UE, a DCI message including an indication of the dormancy status of the one or more control channel resources, and transmit, to the UE, control signals over the one or more control channel resources according to the determined dormancy status of the one or more control channel resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by at least one processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting coreset and search space set dormancy indication via DCI).

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
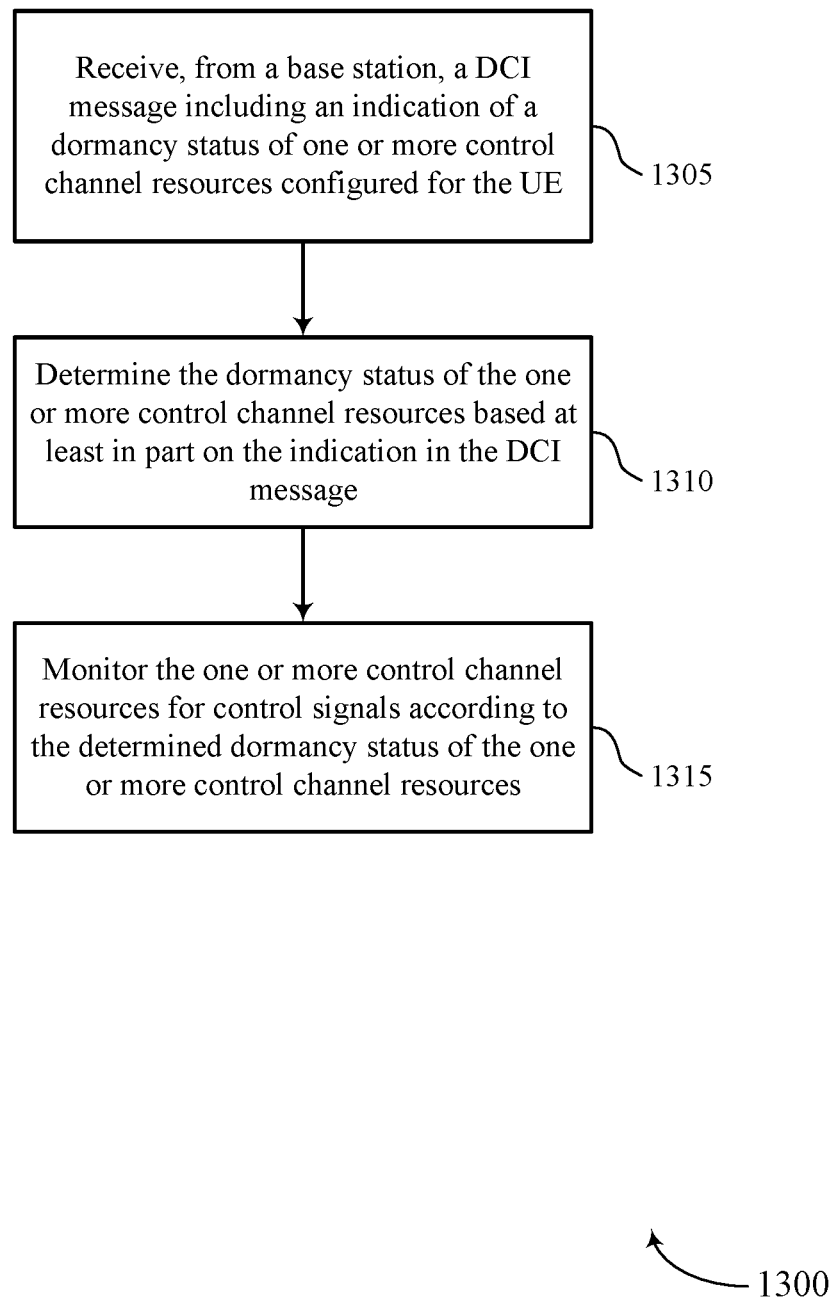
FIGS. 13 through 18 show flowcharts illustrating methods that support CORESET and search space set dormancy indication via DCI in accordance with aspects of the present disclosure.

FIG. 13 shows a flowchart illustrating a method 1300 that supports CORESET and search space set dormancy indication via DCI in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a DCI message including an indication of a dormancy status of one or more control channel resources configured for the UE. The operations of 1305 may be performed according to the methods described herein. In some examples, aspects of the operations of 1305 may be performed by a DCI component as described with reference to FIGS. 5 through 8.

At 1310, the UE may determine the dormancy status of the one or more control channel resources based at least in part on the indication in the DCI message. The operations of 1310 may be performed according to the methods described herein. In some examples, aspects of the operations of 1310 may be performed by a dormancy status component as described with reference to FIGS. 5 through 8.

At 1315, the UE may monitor the one or more control channel resources for control signals according to the determined dormancy status of the one or more control channel resources. The operations of 1315 may be performed according to the methods described herein. In some examples, aspects of the operations of 1315 may be performed by a monitoring component as described with reference to FIGS. 5 through 8.

Figure 14:
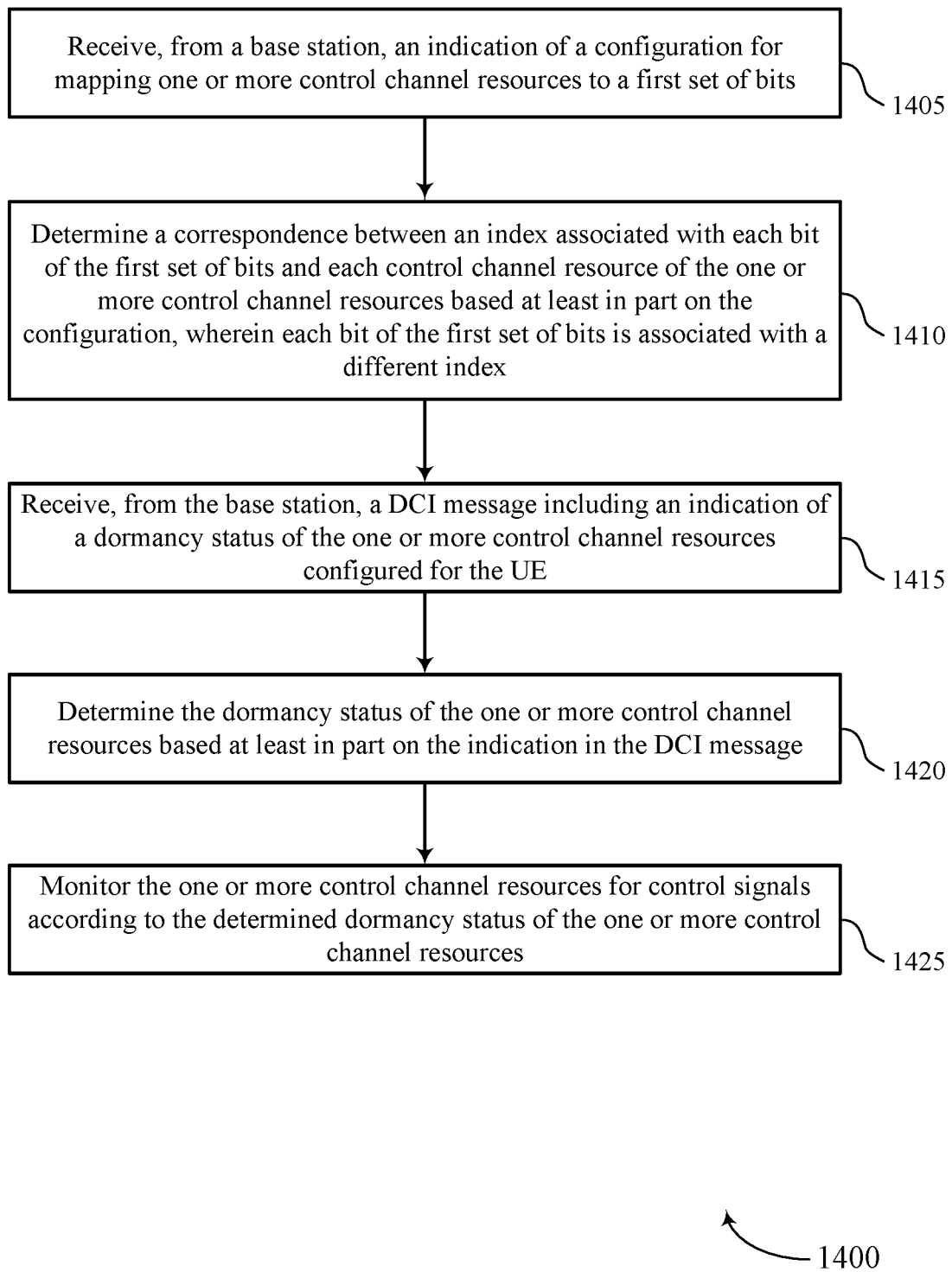

FIG. 14 shows a flowchart illustrating a method 1400 that supports CORESET and search space set dormancy indication via DCI in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, an indication of a configuration for mapping one or more control channel resources to a first set of bits. The operations of 1405 may be performed according to the methods described herein. In some examples, aspects of the operations of 1405 may be performed by a mapping component as described with reference to FIGS. 5 through 8.

At 1410, the UE may determine a correspondence between an index associated with each bit of the first set of bits and each control channel resource of the one or more control channel resources based at least in part on the configuration, wherein each bit of the first set of bits is associated with a different index. The operations of 1410 may be performed according to the methods described herein. In some examples, aspects of the operations of 1410 may be performed by a mapping component as described with reference to FIGS. 5 through 8.

At 1415, the UE may receive, from the base station, a DCI message including an indication of a dormancy status of the one or more control channel resources configured for the UE. In some examples, the indication of the dormancy status may include the first set of bits. The operations of 1415 may be performed according to the methods described herein. In some examples, aspects of the operations of 1415 may be performed by a DCI component as described with reference to FIGS. 5 through 8.

At 1420, the UE may determine the dormancy status of the one or more control channel resources based at least in part on the indication in the DCI message. The operations of 1420 may be performed according to the methods described herein. In some examples, aspects of the operations of 1420 may be performed by a dormancy status component as described with reference to FIGS. 5 through 8.

At 1425, the UE may monitor the one or more control channel resources for control signals according to the determined dormancy status of the one or more control channel resources. The operations of 1425 may be performed according to the methods described herein. In some examples, aspects of the operations of 1425 may be performed by a monitoring component as described with reference to FIGS. 5 through 8.

Figure 15:
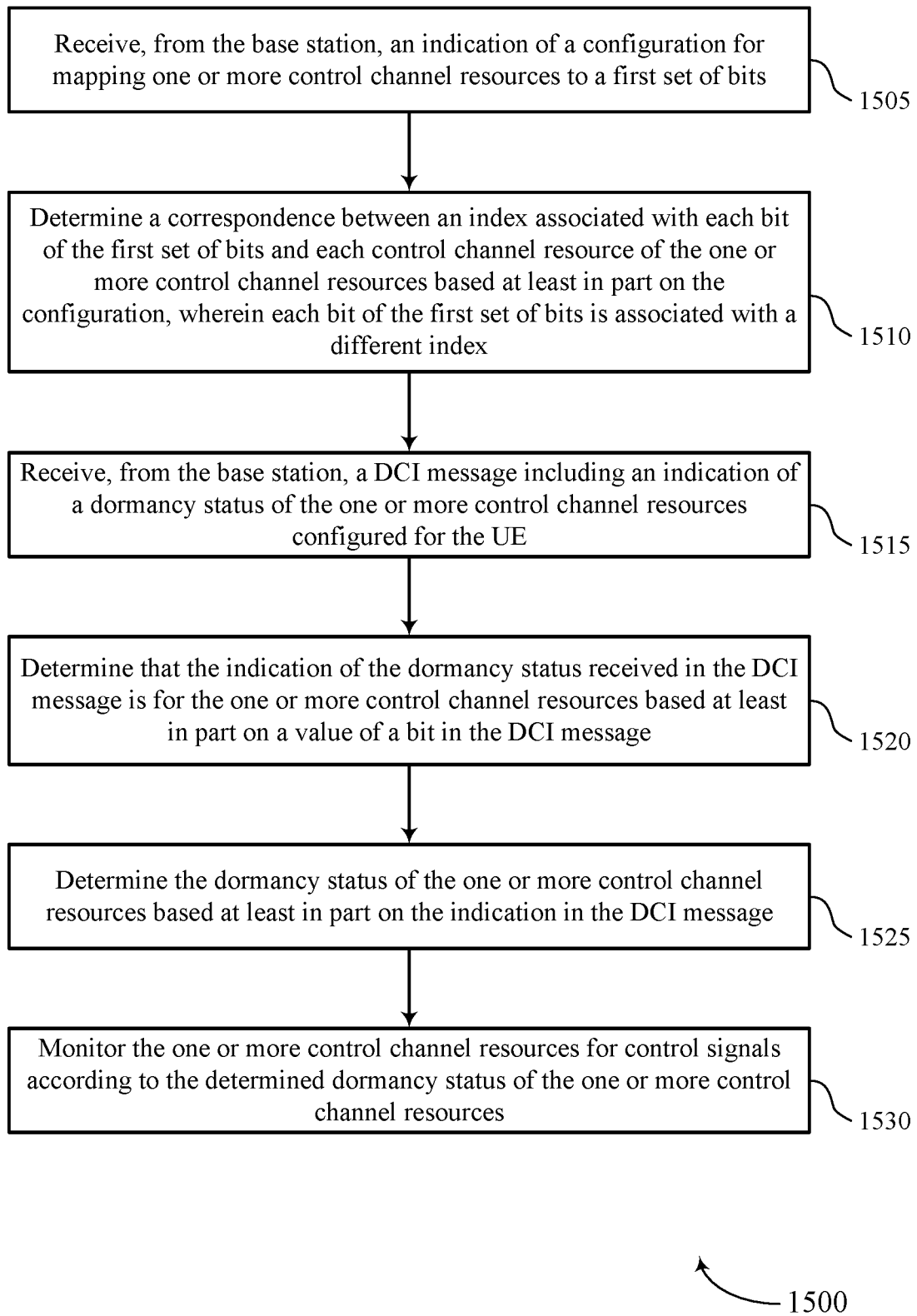

FIG. 15 shows a flowchart illustrating a method 1500 that supports CORESET and search space set dormancy indication via DCI in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an indication of a configuration for mapping one or more control channel resources to a first set of bits. The operations of 1505 may be performed according to the methods described herein. In some examples, aspects of the operations of 1505 may be performed by a mapping component as described with reference to FIGS. 5 through 8.

At 1510, the UE may determine a correspondence between an index associated with each bit of the first set of bits and each control channel resource of the one or more control channel resources based at least in part on the configuration, wherein each bit of the first set of bits is associated with a different index. The operations of 1510 may be performed according to the methods described herein. In some examples, aspects of the operations of 1510 may be performed by a mapping component as described with reference to FIGS. 5 through 8.

At 1515, the UE may receive, from the base station, a DCI message including an indication of a dormancy status of the one or more control channel resources configured for the UE. The operations of 1515 may be performed according to the methods described herein. In some examples, aspects of the operations of 1515 may be performed by a DCI component as described with reference to FIGS. 5 through 8.

At 1520, the UE may determine that the indication of the dormancy status received in the DCI message is for the one or more control channel resources based at least in part on a value of a bit in the DCI message. The operations of 1520 may be performed according to the methods described herein. In some examples, aspects of the operations of 1520 may be performed by a DCI component as described with reference to FIGS. 5 through 8.

At 1525, the UE may determine the dormancy status of the one or more control channel resources based at least in part on the indication in the DCI message. The operations of 1525 may be performed according to the methods described herein. In some examples, aspects of the operations of 1525 may be performed by a dormancy status component as described with reference to FIGS. 5 through 8.

At 1530, the UE may monitor the one or more control channel resources for control signals according to the determined dormancy status of the one or more control channel resources. The operations of 1530 may be performed according to the methods described herein. In some examples, aspects of the operations of 1530 may be performed by a monitoring component as described with reference to FIGS. 5 through 8.

Figure 16:
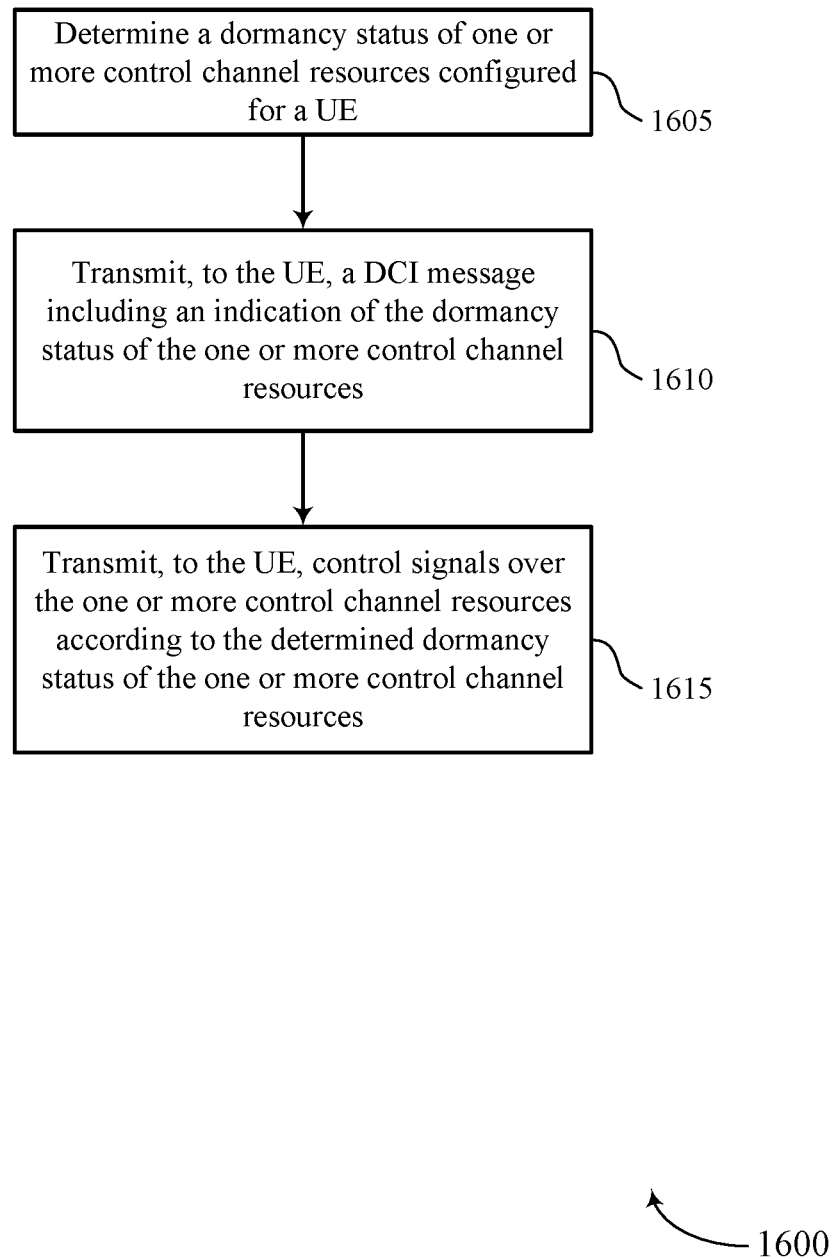

FIG. 16 shows a flowchart illustrating a method 1600 that supports CORESET and search space set dormancy indication via DCI in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may determine a dormancy status of one or more control channel resources configured for a UE. The operations of 1605 may be performed according to the methods described herein. In some examples, aspects of the operations of 1605 may be performed by a dormancy status component as described with reference to FIGS. 9 through 12.

At 1610, the base station may transmit, to the UE, a DCI message including an indication of the dormancy status of the one or more control channel resources. The operations of 1610 may be performed according to the methods described herein. In some examples, aspects of the operations of 1610 may be performed by a DCI component as described with reference to FIGS. 9 through 12.

At 1615, the base station may transmit, to the UE, control signals over the one or more control channel resources according to the determined dormancy status of the one or more control channel resources. The operations of 1615 may be performed according to the methods described herein. In some examples, aspects of the operations of 1615 may be performed by a control signaling component as described with reference to FIGS. 9 through 12.

Figure 17:
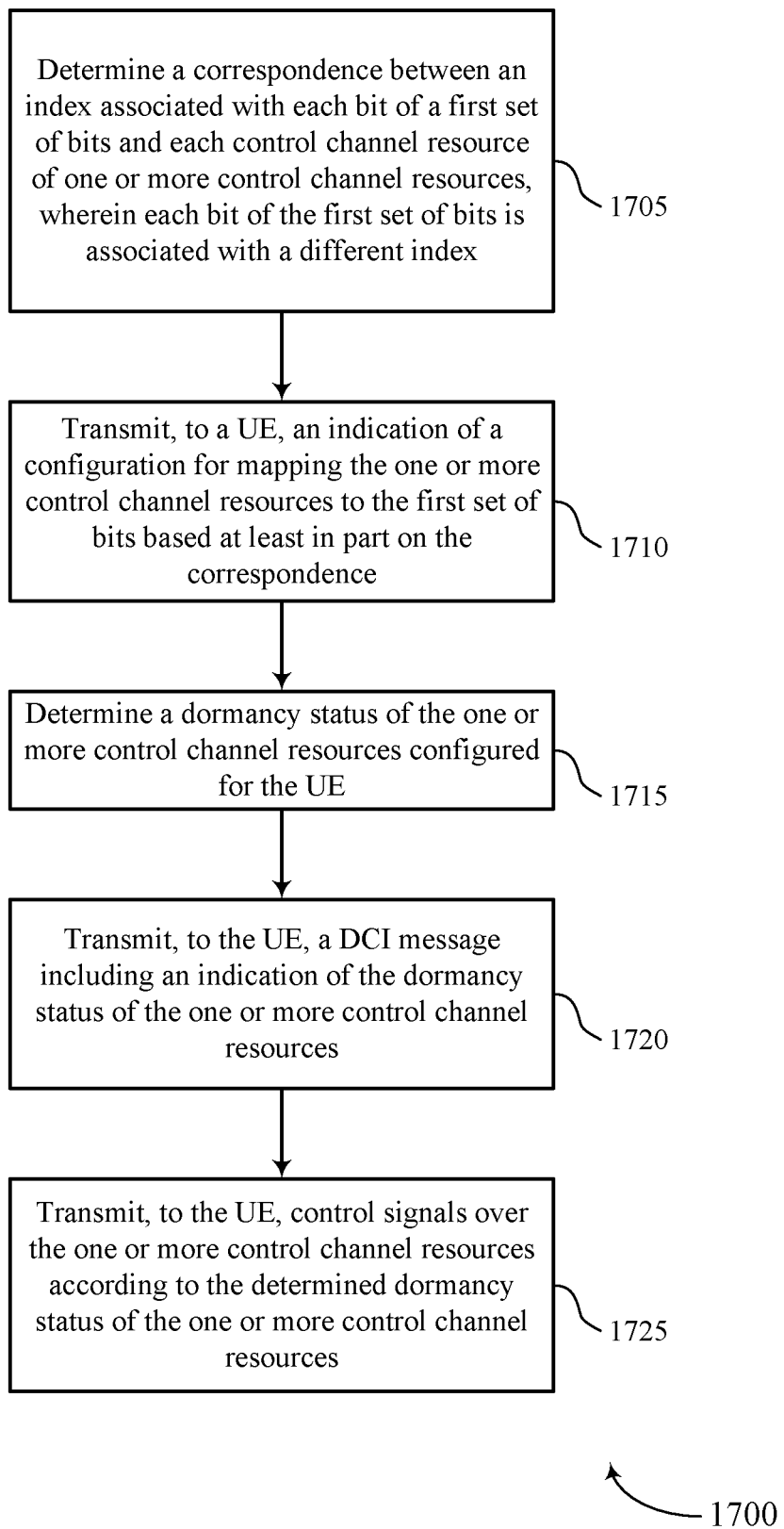

FIG. 17 shows a flowchart illustrating a method 1700 that supports CORESET and search space set dormancy indication via DCI in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may determine a correspondence between an index associated with each bit of a first set of bits and each control channel resource of one or more control channel resources, wherein each bit of the first set of bits is associated with a different index. The operations of 1705 may be performed according to the methods described herein. In some examples, aspects of the operations of 1705 may be performed by a mapping component as described with reference to FIGS. 9 through 12.

At 1710, the base station may transmit, to a UE, an indication of a configuration for mapping the one or more control channel resources to the first set of bits based at least in part on the correspondence. The operations of 1710 may be performed according to the methods described herein. In some examples, aspects of the operations of 1710 may be performed by a mapping component as described with reference to FIGS. 9 through 12.

At 1715, the base station may determine a dormancy status of the one or more control channel resources configured for the UE. The operations of 1715 may be performed according to the methods described herein. In some examples, aspects of the operations of 1715 may be performed by a dormancy status component as described with reference to FIGS. 9 through 12.

At 1720, the base station may transmit, to the UE, a DCI message including an indication of the dormancy status of the one or more control channel resources. The operations of 1720 may be performed according to the methods described herein. In some examples, aspects of the operations of 1720 may be performed by a DCI component as described with reference to FIGS. 9 through 12.

At 1725, the base station may transmit, to the UE, control signals over the one or more control channel resources according to the determined dormancy status of the one or more control channel resources. The operations of 1725 may be performed according to the methods described herein. In some examples, aspects of the operations of 1725 may be performed by a control signaling component as described with reference to FIGS. 9 through 12.

Figure 18:
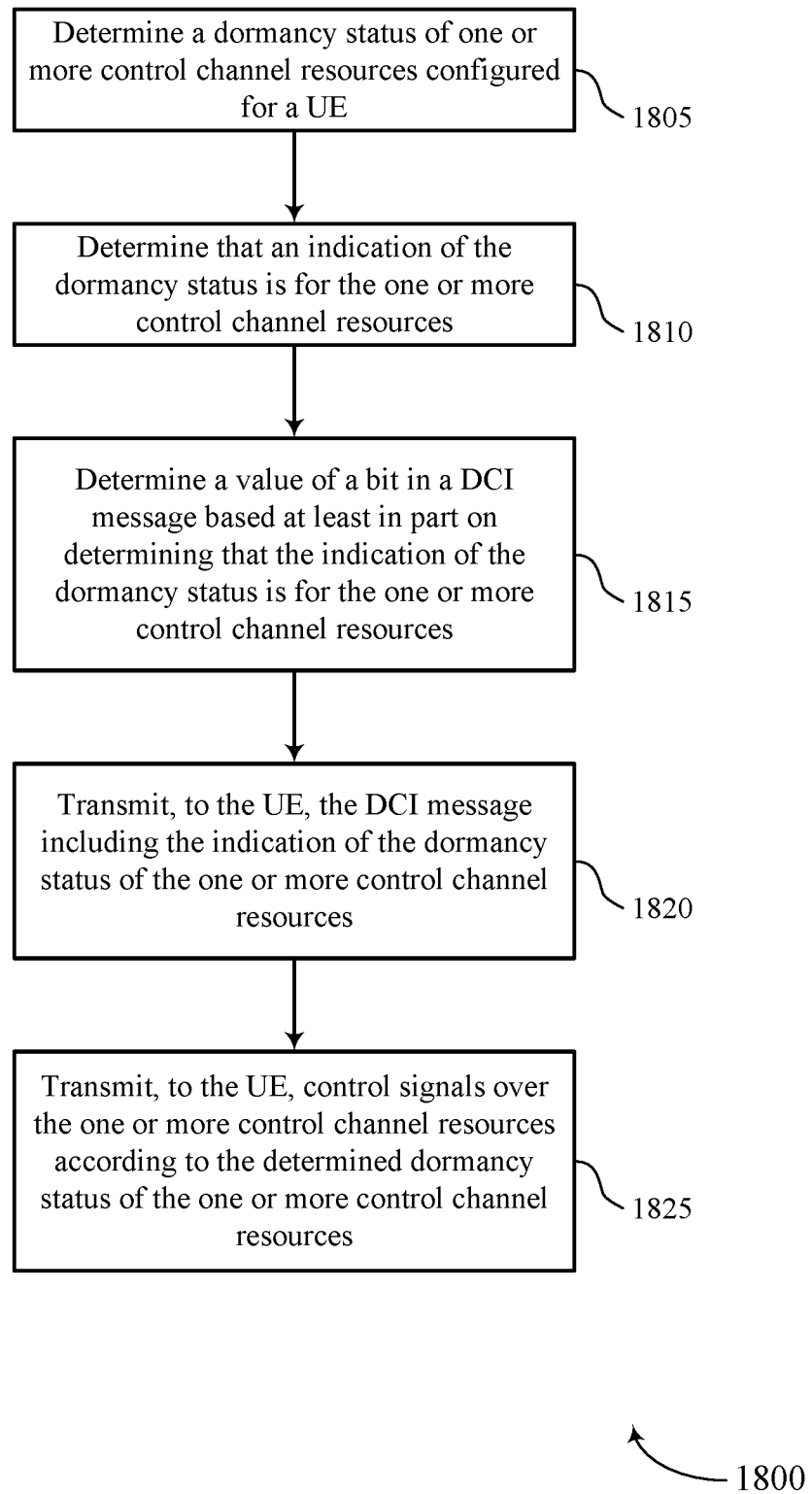

FIG. 18 shows a flowchart illustrating a method 1800 that supports CORESET and search space set dormancy indication via DCI in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may determine a dormancy status of one or more control channel resources configured for a UE. The operations of 1805 may be performed according to the methods described herein. In some examples, aspects of the operations of 1805 may be performed by a dormancy status component as described with reference to FIGS. 9 through 12.

At 1810, the base station may determine that an indication of the dormancy status is for the one or more control channel resources. The operations of 1810 may be performed according to the methods described herein. In some examples, aspects of the operations of 1810 may be performed by a dormancy status component as described with reference to FIGS. 9 through 12.

At 1815, the base station may determine a value of a bit in a DCI message based at least in part on determining that the indication of the dormancy status is for the one or more control channel resources. The operations of 1815 may be performed according to the methods described herein. In some examples, aspects of the operations of 1815 may be performed by a DCI component as described with reference to FIGS. 9 through 12.

At 1820, the base station may transmit, to the UE, the DCI message including the indication of the dormancy status of the one or more control channel resources. The operations of 1820 may be performed according to the methods described herein. In some examples, aspects of the operations of 1820 may be performed by a DCI component as described with reference to FIGS. 9 through 12.

At 1825, the base station may transmit, to the UE, control signals over the one or more control channel resources according to the determined dormancy status of the one or more control channel resources. The operations of 1825 may be performed according to the methods described herein. In some examples, aspects of the operations of 1825 may be performed by a control signaling component as described with reference to FIGS. 9 through 12.

The following provides an overview of aspects of the present disclosure:

Aspect 1: A method for wireless communication at a UE, comprising: receiving, from a base station, a DCI message comprising an indication of a dormancy status of one or more control channel resources configured for the UE; determining the dormancy status of the one or more control channel resources based at least in part on the indication in the DCI message; and monitoring the one or more control channel resources for control signals according to the determined dormancy status of the one or more control channel resources.

Aspect 2: The method of aspect 1, wherein the indication of the dormancy status of the one or more control channel resources comprises a first set of bits, the method further comprising: receiving, from the base station, an indication of a configuration for mapping the one or more control channel resources to the first set of bits; and determining a correspondence between an index associated with each bit of the first set of bits and each control channel resource of the one or more control channel resources based at least in part on the configuration, wherein each bit of the first set of bits is associated with a different index.

Aspect 3: The method of aspect 2, wherein determining the dormancy status of the one or more control channel resources based at least in part on the indication comprises: determining a value of a first bit of the first set of bits, wherein a first index associated with the first bit corresponds to a first control channel resource of the one or more control channel resources; and determining the dormancy status of the first control channel resource based at least in part on the value of the first bit.

Aspect 4: The method of aspect 3, wherein determining the dormancy status of the first control channel resource based at least in part on the value of the first bit comprises: determining that the first control channel resource is non-dormant.

Aspect 5: The method of aspect 4, wherein the first control channel resource comprises a CORESET, the method further comprising: monitoring a search space set associated with the CORESET according to a second dormancy status of the search space set.

Aspect 6: The method of aspect 3, wherein determining the dormancy status of the first control channel resource based at least in part on the value of the first bit comprises: determining that the first control channel resource is dormant.

Aspect 7: The method of aspect 6, wherein the first control channel resource comprises a CORESET, the method further comprising: refraining from monitoring a search space set associated with the CORESET.

Aspect 8: The method of any of aspects 3 through 7, wherein determining the dormancy status of the first control channel resource based at least in part on the value of the first bit comprises: determining to maintain the dormancy status of the first control channel resource.

Aspect 9: The method of any of aspects 3 through 7, wherein determining the dormancy status of the first control channel resource based at least in part on the value of the first bit comprises: determining to change the dormancy status of the first control channel resource.

Aspect 10: The method of any of aspects 2 through 9, further comprising: determining an identifier associated with each control channel resource of the one or more control channel resources, wherein the correspondence between the index associated with each bit of the first set of bits and each control channel resource of the one or more control channel resources is based at least in part on an order of the identifier associated with each control channel resource.

Aspect 11: The method of aspect 10, further comprising: ordering the one or more control channel resources from a lowest identifier to a highest identifier, wherein a first index associated with a first bit of the first set of bits corresponds to a first control channel resource associated with the lowest identifier and a last index associated with a last bit of the first set of bits corresponds to a second control channel resource associated with the highest identifier.

Aspect 12: The method of aspect 10, further comprising: ordering the one or more control channel resources from a highest identifier to a lowest identifier, wherein a first index associated with a first bit of the first set of bits corresponds to a first control channel resource associated with the highest identifier and a last index associated with a last bit of the first set of bits corresponds to a second control channel resource associated with the lowest identifier.

Aspect 13: The method of any of aspects 10 through 12, further comprising: receiving, from the base station, a network signaling message comprising an indication of the one or more control channel resources; and determining the order of the one or more control channel resources based at least in part on the indication of the one or more control channel resources in the network signaling message.

Aspect 14: The method of any of aspects 2 through 13, wherein each bit of the first set of bits corresponds to a single control channel resource of the one or more control channel resources.

Aspect 15: The method of any of aspects 2 through 13, wherein each bit of the first set of bits corresponds to a group of control channel resources of the one or more control channel resources.

Aspect 16: The method of any of aspects 2 through 15, wherein the one or more control channel resources comprise one or more CORESETs and one or more search space sets, and a first subset of the first set of bits are associated with the one or more CORESETs and a second subset of the first set of bits are associated with the one or more search space sets.

Aspect 17: The method of aspect 16, wherein the first subset of the first set of bits associated with the one or more CORESETs precede the second subset of the first set of bits associated with the one or more search space sets.

Aspect 18: The method of aspect 16, wherein the second subset of the first set of bits associated with the one or more search space sets precede the first subset of the first set of bits associated with the one or more CORESETs.

Aspect 19: The method of any of aspects 1 through 18, wherein the DCI message comprises a second indication of a dormancy status of one or more cells, the indication comprising a first set of bits mapped to the one or more control channel resources and the second indication comprising a second set of bits mapped to the one or more cells.

Aspect 20: The method of aspect 19, wherein the first set of bits mapped to the one or more control channel resources precede the second set of bits mapped to the one or more cells.

Aspect 21: The method of aspect 19, wherein the second set of bits mapped to the one or more cells precede the first set of bits mapped to the one or more control channel resources.

Aspect 22: The method of any of aspects 1 through 21, further comprising: determining that the indication of the dormancy status received in the DCI message is for the one or more control channel resources based at least in part on a value of a bit in the DCI message.

Aspect 23: The method of aspect 22, wherein the bit is one of a quantity of bits appended to the DCI message to convey the indication of the dormancy status.

Aspect 24: The method of aspect 22, wherein the bit is one of at least two bits in the DCI message that are not used for the dormancy indication.

Aspect 25: The method of any of aspects 1 through 24, wherein monitoring the one or more control channel resources comprises: monitoring the one or more control channel resources for the control signals from the base station according to the determined dormancy status of the one or more control channel resources.

Aspect 26: The method of aspect 25, wherein monitoring the one or more control channel resources further comprises: monitoring at least one of the one or more control channel resources for the control signals from the base station, wherein the base station is a scheduling base station for the UE.

Aspect 27: The method of any of aspects 25 through 26, wherein the indication of the dormancy status of the one or more control channel resources indicates that at least a subset of the one or more control channel resources are switched from dormant to non-dormant, the method further comprising: determining a data channel resource for receiving unicast data based at least in part on monitoring at least the subset of the one or more control channel resources; and receiving, from the base station, the unicast data over the data channel resource.

Aspect 28: The method of any of aspects 1 through 27, wherein the base station comprises a first base station, and monitoring the one or more control channel resources comprises: monitoring the one or more control channel resources for the control signals from a second base station different than the first base station according to the determined dormancy status of the one or more control channel resources.

Aspect 29: The method of aspect 28, further comprising: determining to monitor the one or more control channel resources for the control signals from the second base station based at least in part on a CIF included in the DCI message.

Aspect 30: The method of any of aspects 1 through 29, wherein monitoring the one or more control channel resources comprises: monitoring the one or more control channel resources for the control signals from a plurality of base stations that include the base station.

Aspect 31: The method of any of aspects 1 through 18 or 22 through 30, wherein the DCI message conveys the indication of the dormancy status of the one or more control channel resources exclusive of a dormancy status of the one or more cells.

Aspect 32: A method for wireless communication at a base station, comprising: determining a dormancy status of one or more control channel resources configured for a UE; transmitting, to the UE, a DCI message comprising an indication of the dormancy status of the one or more control channel resources; and transmitting, to the UE, control signals over the one or more control channel resources according to the determined dormancy status of the one or more control channel resources.

Aspect 33: The method of aspect 32, wherein the indication of the dormancy status of the one or more control channel resources comprises a first set of bits, the method further comprising: determining a correspondence between an index associated with each bit of the first set of bits and each control channel resource of the one or more control channel resources, wherein each bit of the first set of bits is associated with a different index; and transmitting, to the UE, an indication of a configuration for mapping the one or more control channel resources to the first set of bits based at least in part on the correspondence.

Aspect 34: The method of aspect 33, wherein determining the dormancy status of the one or more control channel resources comprises: determining the dormancy status of a first control channel resource of the one or more control channel resources; and determining a value of a first bit of the first set of bits based at least in part on the dormancy status of the first control channel resource, wherein a first index associated with the first bit corresponds to the first control channel resource.

Aspect 35: The method of aspect 34, wherein determining the dormancy status of the first control channel resource comprises: determining that the first control channel resource is non-dormant.

Aspect 36: The method of aspect 35, wherein the first control channel resource comprises a CORESET, the method further comprising: transmitting at least one control signal of the control signals over a search space set associated with the CORESET according to a second dormancy status of the search space set.

Aspect 37: The method of aspect 34, wherein determining the dormancy status of the first control channel resource comprises: determining that the first control channel resource is dormant.

Aspect 38: The method of aspect 37, wherein the first control channel resource comprises a CORESET, the method further comprising: refraining from transmitting the control signals over a search space set associated with the CORESET.

Aspect 39: The method of any of aspects 34 through 38, wherein determining the dormancy status of the first control channel resource comprises: determining to maintain the dormancy status of the first control channel resource.

Aspect 40: The method of any of aspects 34 through 38, wherein determining the dormancy status of the first control channel resource comprises: determining to change the dormancy status of the first control channel resource.

Aspect 41: The method of any of aspects 33 through 40, further comprising: determining an identifier associated with each control channel resource of the one or more control channel resources, wherein the correspondence between the index associated with each bit of the first set of bits and each control channel resource of the one or more control channel resources is based at least in part on an order of the identifier associated with each control channel resource.

Aspect 42: The method of aspect 41, further comprising: ordering the one or more control channel resources from a lowest identifier to a highest identifier, wherein a first index associated with a first bit of the first set of bits corresponds to a first control channel resource associated with the lowest identifier and a last index associated with a last bit of the first set of bits corresponds to a second control channel resource associated with the highest identifier.

Aspect 43: The method of aspect 41, further comprising: ordering the one or more control channel resources from a highest identifier to a lowest identifier, wherein a first index associated with a first bit of the first set of bits corresponds to a first control channel resource associated with the highest identifier and a last index associated with a last bit of the first set of bits corresponds to a second control channel resource associated with the lowest identifier.

Aspect 44: The method of any of aspects 41 through 43, further comprising: determining the order of the one or more control channel resources; and transmitting, to the UE, a network signaling message comprising an indication of the one or more control channel resources, wherein the indication of the one or more control channel resources in the network signaling message is based at least in part on the order.

Aspect 45: The method of any of aspects 33 through 44, wherein each bit of the first set of bits corresponds to a single control channel resource of the one or more control channel resources.

Aspect 46: The method of any of aspects 33 through 44, wherein each bit of the first set of bits corresponds to a group of control channel resources of the one or more control channel resources.

Aspect 47: The method of any of aspects 33 through 46, wherein the one or more control channel resources comprise one or more CORESETs and one or more search space sets, and a first subset of the first set of bits are associated with the one or more CORESETs and a second subset of the first set of bits are associated with the one or more search space sets.

Aspect 48: The method of aspect 47, wherein the first subset of the first set of bits associated with the one or more CORESETs precede the second subset of the first set of bits associated with the one or more search space sets.

Aspect 49: The method of aspect 47, wherein the second subset of the first set of bits associated with the one or more search space sets precede the first subset of the first set of bits associated with the one or more CORESETs.

Aspect 50: The method of any of aspects 32 through 49, wherein the DCI message comprises a second indication of a dormancy status of one or more cells, the indication comprising a first set of bits mapped to the one or more control channel resources and the second indication comprising a second set of bits mapped to the one or more cells.

Aspect 51: The method of aspect 50, wherein the first set of bits mapped to the one or more control channel resources precede the second set of bits mapped to the one or more cells.

Aspect 52: The method of aspect 50, wherein the second set of bits mapped to the one or more cells precede the first set of bits mapped to the one or more control channel resources.

Aspect 53: The method of any of aspects 32 through 52, further comprising: determining that the indication of the dormancy status is for the one or more control channel resources; and determining a value of a bit in the DCI message based at least in part on determining that the indication of the dormancy status is for the one or more control channel resources.

Aspect 54: The method of aspect 53, wherein the bit is one of a quantity of bits appended to the DCI message to convey the indication of the dormancy status.

Aspect 55: The method of aspect 53, wherein the bit is one of at least two bits in the DCI message that are not used for the dormancy indication.

Aspect 56: The method of any of aspects 32 through 55, wherein transmitting the control signals over the one or more control channel resources according to the determined dormancy status of the one or more control channel resources comprises: transmitting the control signals over at least one of the one or more control channel resources, wherein the base station is a scheduling base station for the UE.

Aspect 57: The method of any of aspects 32 through 56, wherein the indication of the dormancy status of the one or more control channel resources indicates at least a subset of the one or more control channel resources are switched from dormant to non-dormant, the method further comprising: transmitting, to the UE, an indication of a data channel resource over a control channel resource of at least the subset of control channel resources; and transmitting, to the UE, unicast data over the data channel resource.

Aspect 58: The method of any of aspects 32 through 57, wherein the one or more control channel resources comprise control channel resources associated with a plurality of base stations that include the base station.

Aspect 59: The method of any of aspects 32 through 49 or 51 through 58, wherein the DCI message conveys the indication of the dormancy status of the one or more control channel resources exclusive of a dormancy status of one or more cells.

Aspect 60: An apparatus for wireless communication at a UE, comprising at least one processor; memory coupled with the at least one processor; and instructions stored in the memory and executable by the at least one processor to cause the apparatus to perform a method of any of aspects 1 through 31.

Aspect 61: An apparatus for wireless communication at a UE, comprising at least one means for performing a method of any of aspects 1 through 31.

Aspect 62: A non-transitory computer-readable medium storing code for wireless communication at a UE, the code comprising instructions executable by at least one processor to perform a method of any of aspects 1 through 31.

Aspect 63: An apparatus for wireless communication at a base station, comprising at least one processor; memory coupled with the at least one processor; and instructions stored in the memory and executable by the at least one processor to cause the apparatus to perform a method of any of aspects 32 through 59.

Aspect 64: An apparatus for wireless communication at a base station, comprising at least one means for performing a method of any of aspects 32 through 59.

Aspect 65: A non-transitory computer-readable medium storing code for wireless communication at a base station, the code comprising instructions executable by at least one processor to perform a method of any of aspects 32 through 59.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network device, a downlink control information message comprising a first set of bits indicative of a dormancy status of each of one or more control channel resources in an active bandwidth part configured for the UE, wherein an index of each bit of the first set of bits corresponds to a control channel resource of the one or more control channel resources in the active bandwidth part; and
   monitoring the one or more control channel resources for control signals according to the dormancy status of each of the one or more control channel resources.

2. The method of claim 1, further comprising:
   receiving, from the network device, an indication of a configuration for mapping the one or more control channel resources to the first set of bits; and
   determining the correspondence between the index associated with each bit of the first set of bits and each control channel resource of the one or more control channel resources based at least in part on the configuration, wherein each bit of the first set of bits is associated with a different index.

3. The method of claim 2, further comprising:
   determining a value of a first bit of the first set of bits, wherein a first index associated with the first bit corresponds to a first control channel resource of the one or more control channel resources; and
   determining the dormancy status of the first control channel resource based at least in part on the value of the first bit.

4. The method of claim 3, wherein the first control channel resource comprises a control resource set, and determining the dormancy status of the first control channel resource based at least in part on the value of the first bit comprises:
   determining that the control resource set is non-dormant, and monitoring a search space set associated with the control resource set according to a second dormancy status of the search space set; or determining that the control resource set is dormant, and refraining from monitoring the search space set associated with the control resource set.

5. The method of claim 3, wherein determining the dormancy status of the first control channel resource based at least in part on the value of the first bit comprises:
   determining to maintain or to change the dormancy status of the first control channel resource based at least in part on the value of the first bit.

6. The method of claim 2, further comprising:
   determining an identifier associated with each control channel resource of the one or more control channel resources, wherein the correspondence between the index associated with each bit of the first set of bits and each control channel resource of the one or more control channel resources is based at least in part on an order of the identifier associated with each control channel resource; and
   ordering the one or more control channel resources from a lowest identifier to a highest identifier, wherein a first index associated with a first bit of the first set of bits corresponds to a first control channel resource associated with the lowest identifier and a last index associated with a last bit of the first set of bits corresponds to a second control channel resource associated with the highest identifier, or ordering the one or more control channel resources from the highest identifier to the lowest identifier, wherein the first index associated with the first bit of the first set of bits corresponds to a first control channel resource associated with the highest identifier and the last index associated with the last bit of the first set of bits corresponds to a second control channel resource associated with the lowest identifier.

7. The method of claim 6, further comprising:
   receiving, from the network device, a network signaling message comprising an indication of the one or more control channel resources; and
   determining the order of the one or more control channel resources based at least in part on the indication of the one or more control channel resources in the network signaling message.

8. The method of claim 2, wherein each bit of the first set of bits corresponds to a single control channel resource of the one or more control channel resources, or a group of control channel resources of the one or more control channel resources.

9. The method of claim 2, wherein the one or more control channel resources comprise one or more control resource sets and one or more search space sets, and wherein a first subset of the first set of bits are associated with the one or more control resource sets and a second subset of the first set of bits are associated with the one or more search space sets.

10. The method of claim 1, wherein the downlink control information message conveys the first set of bits indicative of the dormancy status of the one or more control channel resources exclusive of a dormancy status of one or more cells.

11. The method of claim 1, wherein the downlink control information message comprises a second indication of a dormancy status of one or more cells, the first set of bits being mapped to the one or more control channel resources and the second indication comprising a second set of bits mapped to the one or more cells.

12. The method of claim 1, further comprising:
   determining that the first set of bits indicative of the dormancy status received in the downlink control information message is for the one or more control channel resources based at least in part on a value of a bit in the downlink control information message, wherein the bit is of the first set of bits, or the bit is one of at least two bits in the downlink control information message that are not of the first set of bits.

13. The method of claim 1, wherein monitoring the one or more control channel resources comprises:
   monitoring at least one of the one or more control channel resources for the control signals from the network device according to the dormancy status of the one or more control channel resources, wherein the network device is a scheduling network device for the UE.

14. The method of claim 1, wherein monitoring the one or more control channel resources comprises monitoring the one or more control channel resources for the control signals from the network device according to the dormancy status of the one or more control channel resources, and wherein the first set of bits indicative of the dormancy status of the one or more control channel resources indicates that at least a subset of the one or more control channel resources are switched from dormant to non-dormant, the method further comprising:
   determining a data channel resource for receiving unicast data based at least in part on monitoring at least the subset of the one or more control channel resources; and receiving, from the network device, the unicast data over the data channel resource.

15. The method of claim 1, wherein the network device comprises a first network device, and monitoring the one or more control channel resources comprises:
monitoring, based at least in part on a carrier indicator field included in the downlink control information message, the one or more control channel resources for the control signals from a second network device different than the first network device according to the dormancy status of the one or more control channel resources.

16. The method of claim 1, wherein monitoring the one or more control channel resources comprises:
monitoring the one or more control channel resources for the control signals from a plurality of network devices that include the network device.

17. A method for wireless communication at a network device, comprising:
determining a dormancy status of each of one or more control channel resources in an active bandwidth part configured for a user equipment (UE);
transmitting, to the UE, a downlink control information message comprising a first set of bits indicative of the dormancy status of each of the one or more control channel resources in the active bandwidth part, wherein an index of each bit of the first set of bits corresponds to a control channel resource of the one or more control channel resources in the active bandwidth part; and
transmitting, to the UE, control signals over the one or more control channel resources according to the dormancy status of each of the one or more control channel resources.

18. An apparatus for wireless communication at a user equipment (UE), comprising:
at least one processor,
memory coupled to the at least one processor; and
instructions stored in the memory and executable by the at least one processor to cause the UE to:
receive, from a network device, a downlink control information message comprising a first set of bits indicative of a dormancy status of each of one or more control channel resources in an active bandwidth part configured for the UE, wherein an index of each bit of the first set of bits corresponds to a control channel resource of the one or more control channel resources in the active bandwidth part; and
monitor the one or more control channel resources for control signals according to the dormancy status of each of the one or more control channel resources.

19. The apparatus of claim 18, wherein the instructions are further executable by the at least one processor to cause the UE to:
receive, from the network device, an indication of a configuration for mapping the one or more control channel resources to the first set of bits; and
determine the correspondence between the index associated with each bit of the first set of bits and each control channel resource of the one or more control channel resources based at least in part on the configuration, wherein each bit of the first set of bits is associated with a different index.

20. The apparatus of claim 19, wherein the instructions are further executable by the at least one processor to cause the UE to:
determine a value of a first bit of the first set of bits, wherein a first index associated with the first bit corresponds to a first control channel resource of the one or more control channel resources; and
determine the dormancy status of the first control channel resource based at least in part on the value of the first bit.

21. The apparatus of claim 20, wherein the first control channel resource comprises a control resource set, and the instructions to determine the dormancy status of the first control channel resource based at least in part on the value of the first bit are executable by the at least one processor to cause the UE to:
determine that the control resource set is non-dormant, and
monitor a search space set associated with the control resource set according to a second dormancy status of the search space set; or
determine that the control resource set is dormant, and
refrain from monitoring the search space set associated with the control resource set.

22. The apparatus of claim 20, wherein the instructions to determine the dormancy status of the first control channel resource based at least in part on the value of the first bit are executable by the at least one processor to cause the UE to:
determine to maintain or to change the dormancy status of the first control channel resource based at least in part on the value of the first bit.

23. The apparatus of claim 19, wherein the instructions are further executable by the at least one processor to cause the UE to:
determine an identifier associated with each control channel resource of the one or more control channel resources, wherein the correspondence between the index associated with each bit of the first set of bits and each control channel resource of the one or more control channel resources is based at least in part on an order of the identifier associated with each control channel resource; and
order the one or more control channel resources from a lowest identifier to a highest identifier, wherein a first index associated with a first bit of the first set of bits corresponds to a first control channel resource associated with the lowest identifier and a last index associated with a last bit of the first set of bits corresponds to a second control channel resource associated with the highest identifier, or order the one or more control channel resources from the highest identifier to the lowest identifier, wherein the first index associated with the first bit of the first set of bits corresponds to a first control channel resource associated with the highest identifier and the last index associated with the last bit of the first set of bits corresponds to a second control channel resource associated with the lowest identifier.

24. The apparatus of claim 23, wherein the instructions are further executable by the at least one processor to cause the UE to:
receive, from the network device, a network signaling message comprising an indication of the one or more control channel resources; and
determine the order of the one or more control channel resources based at least in part on the indication of the one or more control channel resources in the network signaling message.

25. The apparatus of claim 19, wherein each bit of the first set of bits corresponds to a single control channel resource of the one or more control channel resources, or a group of control channel resources of the one or more control channel resources.

26. The apparatus of claim 19, wherein the one or more control channel resources comprise one or more control resource sets and one or more search space sets, and wherein a first subset of the first set of bits are associated with the one or more control resource sets and a second subset of the first set of bits are associated with the one or more search space sets.

27. The apparatus of claim 18, wherein the downlink control information message conveys the first set of bits indicative of the dormancy status of the one or more control channel resources exclusive of a dormancy status of one or more cells.

28. The apparatus of claim 18, wherein the downlink control information message comprises a second indication of a dormancy status of one or more cells, the first set of bits being mapped to the one or more control channel resources and the second indication comprising a second set of bits mapped to the one or more cells.

29. The apparatus of claim 18, wherein the instructions are further executable by the at least one processor to cause the UE to:

determine that the first set of bits indicative of the dormancy status received in the downlink control information message is for the one or more control channel resources based at least in part on a value of a bit in the downlink control information message, wherein the bit is of the first set of bits indicative of the dormancy status, or the bit is one of at least two bits in the downlink control information message that are not of the first set of bits.

30. An apparatus for wireless communication at a network device, comprising:

at least one processor, memory coupled to the at least one processor; and instructions stored in the memory and executable by the at least one processor to cause the network device to:

determine a dormancy status of each of one or more control channel resources in an active bandwidth part configured for a user equipment (UE);

transmit, to the UE, a downlink control information message comprising a first set of bits indicative of the dormancy status of each of the one or more control channel resources in the active bandwidth part, wherein an index of each bit of the first set of bits corresponds to a control channel resource of the one or more control channel resources in the active bandwidth part; and transmit, to the UE, control signals over the one or more control channel resources according to the dormancy status of each of the one or more control channel resources.

\* \* \* \* \*